(12) United States Patent
Kunal et al.

(10) Patent No.: US 9,338,047 B1
(45) Date of Patent: *May 10, 2016

(54) DETECTING CONTENT ON A SOCIAL NETWORK USING BROWSING PATTERNS

(71) Applicant: Google Inc., Mountain View, CA (US)

(72) Inventors: Ranveer Kunal, Dist-Tirunelveli (IN); Kiran S. Panesar, Sunnyvale, CA (US); Madhukar N. Thakur, San Jose, CA (US); Amogh S. Asgekar, Navi Mumbai (IN)

(73) Assignee: Google Inc., Mountain View, CA (US)

( * ) Notice: Subject to any disclaimer, the term of this patent is extended or adjusted under 35 U.S.C. 154(b) by 581 days.

This patent is subject to a terminal disclaimer.

(21) Appl. No.: 13/646,159

(22) Filed: Oct. 5, 2012

Related U.S. Application Data

(63) Continuation of application No. 12/571,822, filed on Oct. 1, 2009, now Pat. No. 8,311,950.

(51) Int. Cl.
| | |
|---|---|
| *G06Q 30/02* | (2012.01) |
| *G06Q 10/10* | (2012.01) |
| *G06Q 10/06* | (2012.01) |
| *G06Q 40/02* | (2012.01) |
| *G06Q 99/00* | (2006.01) |
| *H04L 29/08* | (2006.01) |
| *G06Q 50/00* | (2012.01) |

(52) U.S. Cl.
CPC .......... *H04L 29/08675* (2013.01); *G06Q 50/01* (2013.01)

(58) Field of Classification Search
USPC .................................................. 705/1.1–912
See application file for complete search history.

(56) References Cited

U.S. PATENT DOCUMENTS

| | | | |
|---|---|---|---|
| 5,724,521 | A | 3/1998 | Dedrick |
| 5,740,549 | A | 4/1998 | Reilly et al. |
| 5,848,397 | A | 12/1998 | Marsh et al. |

(Continued)

FOREIGN PATENT DOCUMENTS

| | | |
|---|---|---|
| EP | 1 544 729 | 6/2005 |
| JP | 11-265369 | 9/1999 |

(Continued)

OTHER PUBLICATIONS

U.S. Appl. No. 95/001,061, Reexam of Stone.

(Continued)

*Primary Examiner* — Jonathan Ouellette
(74) *Attorney, Agent, or Firm* — Fish & Richardson P.C.

(57) ABSTRACT

In one implementation, a computer-implemented method includes receiving information related to users of a social network site and determining a graph for at least a portion of the social network, the graph including a plurality of nodes connected by directional links where each node corresponds to a user having a profile page on the social network and where each directional link corresponds to a user viewing at least an aspect of a profile page for another user. The method can further include identifying first nodes as including content associated with a particular subject of interest, and seeding the identified first nodes with first scores. The method can also include determining second scores for second nodes by propagating the first scores across the social graph based upon third nodes having viewed aspects of profile pages associated with the first nodes and the second nodes; and providing the determined second scores.

20 Claims, 9 Drawing Sheets

(56) References Cited

U.S. PATENT DOCUMENTS

| | | | |
|---|---|---|---|
| 5,918,014 A | 6/1999 | Robinson |
| 5,948,061 A | 9/1999 | Merriman |
| 5,991,429 A | 11/1999 | Coffin et al. |
| 6,009,422 A | 12/1999 | Ciccarelli |
| 6,026,368 A | 2/2000 | Brown et al. |
| 6,044,376 A | 3/2000 | Kurtzman, II |
| 6,078,914 A | 6/2000 | Redfern |
| 6,144,944 A | 11/2000 | Kurtzman et al. |
| 6,167,382 A | 12/2000 | Sparks et al. |
| 6,256,648 B1 | 7/2001 | Hill et al. |
| 6,269,361 B1 | 7/2001 | Davis et al. |
| 6,356,659 B1 | 3/2002 | Wiskott et al. |
| 6,389,372 B1 | 5/2002 | Glance et al. |
| 6,401,075 B1 | 6/2002 | Mason et al. |
| 6,549,896 B1 | 4/2003 | Candan et al. |
| 6,594,673 B1 | 7/2003 | Smith et al. |
| 6,721,733 B2 | 4/2004 | Lipson et al. |
| 6,792,419 B1 | 9/2004 | Raghavan |
| 6,816,836 B2 | 11/2004 | Basu et al. |
| 6,985,882 B1 | 1/2006 | Del Sesto |
| 7,035,467 B2 | 4/2006 | Nicponski |
| 7,039,599 B2 | 5/2006 | Merriman |
| 7,136,875 B2 | 11/2006 | Anderson et al. |
| 7,324,670 B2 | 1/2008 | Kozakaya et al. |
| 7,492,943 B2 | 2/2009 | Li et al. |
| 7,689,682 B1 | 3/2010 | Eldering et al. |
| 7,701,608 B2 | 4/2010 | Katayama et al. |
| 7,765,218 B2 | 7/2010 | Bates et al. |
| 7,801,956 B1 | 9/2010 | Cumberbatch et al. |
| 7,809,163 B2 | 10/2010 | Sheu |
| 7,853,622 B1 | 12/2010 | Baluja et al. |
| 7,904,461 B2 | 3/2011 | Baluja et al. |
| 7,961,986 B1 | 6/2011 | Jing et al. |
| 8,041,082 B1 | 10/2011 | Baluja et al. |
| 8,055,664 B2 | 11/2011 | Baluja et al. |
| 8,145,679 B1 | 3/2012 | Baluja et al. |
| 8,306,922 B1 | 11/2012 | Kunal et al. |
| 8,311,950 B1 | 11/2012 | Kunal et al. |
| 2002/0023230 A1 | 2/2002 | Bolnick et al. |
| 2002/0116466 A1 | 8/2002 | Trevithick et al. |
| 2002/0120506 A1 | 8/2002 | Hagen |
| 2002/0124053 A1 | 9/2002 | Adams et al. |
| 2003/0050977 A1 | 3/2003 | Puthenkulam et al. |
| 2004/0001078 A1 | 1/2004 | Rosing et al. |
| 2004/0042599 A1 | 3/2004 | Zaner et al. |
| 2004/0088325 A1 | 5/2004 | Elder et al. |
| 2004/0122803 A1 | 6/2004 | Dom et al. |
| 2004/0143841 A1 | 7/2004 | Wang et al. |
| 2004/0148275 A1 | 7/2004 | Achlioptas |
| 2004/0202349 A1 | 10/2004 | Erol et al. |
| 2004/0215793 A1 | 10/2004 | Ryan et al. |
| 2004/0267604 A1 | 12/2004 | Gross |
| 2005/0043897 A1 | 2/2005 | Meyer |
| 2005/0091202 A1 | 4/2005 | Thomas |
| 2005/0114325 A1 | 5/2005 | Liu et al. |
| 2005/0125308 A1 | 6/2005 | Puentes et al. |
| 2005/0125408 A1 | 6/2005 | Somaroo et al. |
| 2005/0144069 A1 | 6/2005 | Wiseman et al. |
| 2005/0149395 A1 | 7/2005 | Henkin et al. |
| 2005/0154639 A1 | 7/2005 | Zetmeir |
| 2005/0159998 A1 | 7/2005 | Buyukkokten et al. |
| 2005/0171832 A1 | 8/2005 | Hull et al. |
| 2005/0198031 A1 | 9/2005 | Pezaris et al. |
| 2005/0216300 A1 | 9/2005 | Appelman et al. |
| 2005/0278443 A1 | 12/2005 | Winner et al. |
| 2006/0004704 A1 | 1/2006 | Gross |
| 2006/0031121 A1 | 2/2006 | Speicher |
| 2006/0069584 A1 | 3/2006 | Bates et al. |
| 2006/0085259 A1 | 4/2006 | Nicholas et al. |
| 2006/0136098 A1 | 6/2006 | Chitrapura et al. |
| 2006/0165040 A1 | 7/2006 | Rathod et al. |
| 2006/0184617 A1 | 8/2006 | Nicholas et al. |
| 2006/0190225 A1 | 8/2006 | Grand |
| 2006/0200435 A1 | 9/2006 | Flinn et al. |
| 2006/0204142 A1 | 9/2006 | West et al. |
| 2006/0206308 A1 | 9/2006 | Moore |
| 2006/0218577 A1 | 9/2006 | Goodman et al. |
| 2006/0247940 A1 | 11/2006 | Zhu et al. |
| 2006/0248573 A1 | 11/2006 | Pannu et al. |
| 2006/0271460 A1 | 11/2006 | Hanif |
| 2006/0282328 A1 | 12/2006 | Gerace et al. |
| 2006/0294084 A1 | 12/2006 | Patel et al. |
| 2006/0294134 A1 | 12/2006 | Berkhim et al. |
| 2007/0005341 A1 | 1/2007 | Burges et al. |
| 2007/0043688 A1 | 2/2007 | Kountz et al. |
| 2007/0043766 A1 | 2/2007 | Nicholas et al. |
| 2007/0050446 A1 | 3/2007 | Moore |
| 2007/0106551 A1 | 5/2007 | McGucken |
| 2007/0121843 A1 | 5/2007 | Atazky et al. |
| 2007/0124721 A1 | 5/2007 | Cowing et al. |
| 2007/0192306 A1 | 8/2007 | Papakonstantinou et al. |
| 2007/0203940 A1 | 8/2007 | Wang et al. |
| 2007/0218900 A1 | 9/2007 | Abhyanker |
| 2007/0288462 A1 | 12/2007 | Fischer et al. |
| 2008/0010275 A1 | 1/2008 | Lee et al. |
| 2008/0091834 A1 | 4/2008 | Norton |
| 2008/0103784 A1 | 5/2008 | Wong et al. |
| 2008/0103877 A1 | 5/2008 | Gerken |
| 2008/0104079 A1 | 5/2008 | Craig |
| 2008/0104225 A1 | 5/2008 | Zhang et al. |
| 2008/0120308 A1 | 5/2008 | Martinez et al. |
| 2008/0120411 A1 | 5/2008 | Eberle |
| 2008/0126476 A1 | 5/2008 | Nicholas et al. |
| 2008/0140650 A1 | 6/2008 | Stackpole |
| 2008/0155080 A1 | 6/2008 | Marlow et al. |
| 2008/0159590 A1 | 7/2008 | Yi et al. |
| 2008/0162431 A1 | 7/2008 | Xu et al. |
| 2008/0189169 A1 | 8/2008 | Turpin et al. |
| 2008/0195657 A1 | 8/2008 | Naaman et al. |
| 2008/0215416 A1 | 9/2008 | Ismalon et al. |
| 2008/0222199 A1 | 9/2008 | Tiu et al. |
| 2008/0243607 A1 | 10/2008 | Rohan et al. |
| 2008/0249966 A1 | 10/2008 | Luege Mateos |
| 2008/0275861 A1 | 11/2008 | Baluja et al. |
| 2008/0275899 A1 | 11/2008 | Baluja et al. |
| 2009/0024548 A1 | 1/2009 | Zhu et al. |
| 2009/0063284 A1 | 3/2009 | Turpin et al. |
| 2009/0076800 A1 | 3/2009 | Li et al. |
| 2009/0112701 A1 | 4/2009 | Turpin et al. |
| 2009/0192967 A1 | 7/2009 | Luo et al. |
| 2009/0248661 A1 | 10/2009 | Bilenko et al. |
| 2009/0319288 A1 | 12/2009 | Slaney et al. |
| 2011/0112916 A1 | 5/2011 | Baluja et al. |
| 2011/0268369 A1 | 11/2011 | Richards et al. |
| 2012/0054205 A1 | 3/2012 | Baluja et al. |

FOREIGN PATENT DOCUMENTS

| | | |
|---|---|---|
| JP | 2002-132604 | 5/2002 |
| WO | WO97/21183 | 6/1997 |
| WO | WO00/68860 | 11/2000 |
| WO | WO2004/111771 | 12/2004 |
| WO | WO2006/121575 | 11/2006 |

OTHER PUBLICATIONS

U.S. Appl. No. 95/001,068, Reexam of Stone.
U.S. Appl. No. 95/001,069, Reexam of Stone.
U.S. Appl. No. 95/001,073, Reexam of Stone.
U.S. Appl. No. 11/733,734, filed Apr. 2007, Baluja et al.
Accounts, at http://www.cs.rice.edu/~ssiyer/accounts/, as available via the Internet and printed on Jul. 29, 2004, 6 pages.
Adamic et al., "A Social Network Caught in the Web," at http://firstmonday.org/issues/issue8_6/adamic/, as available via the Internet and printed on Jul. 28, 2004, 29 pages.
AdForce, Inc., A Complete Guide to AdForce, Version 2.6, 1998, 285 pages.
AdForce, Inc., S-1/A SEC Filing, May 6, 1999, 9 pages.
AdKnowledge Campaign Manager: Reviewer's Guide, AdKnowledge, Aug. 1998, 22 pages.
AdKnowledge Market Match Planner: Reviewer's Guide, AdKnowledge, May 1998, 26 pages.

(56) References Cited

OTHER PUBLICATIONS

"About Ad-Star." AdStar.com website archive from www.Archive. org, Apr. 12, 1997, and Feb. 1, 1997, 43 pages.
Amazon.com, "Selling at Amazon Marketplace," at http://pages. amazon.com/exec/obidos/tg/browse/-/1161234/ref=hp_hp_is_4_2/002-283572 as available via the Internet and printed on Jul. 29, 2004, 2 pages.
Amazon.com, "New Seller FAQ," at http://pages.amazon.com/exec/obidos/tg/browse/-/1161274/002-2835726-5513622 as available via the Internet and printed on Jul. 29, 2004, 3 pages.
Azran, "The Rendezvous Algorithm: Multiclass Semi-Supervised Learning with Markov Random Walks," *ICML*, 2007, 8 pages.
Baluja and Rowley, *Intl J Computer Vision*, 2007, 71(1): at http://portal.acm.org/toc.cfm?id=J325&type=periodical&coll=&dl=ACM&CFID=15151515&CFTOKEN=6184618, 9 pages.
Baluja et al., "Video Suggestion and Discovery for YouTube: Taking Random Walks Through the View Graph," Proc. 17th International World Wide Web Conference (WWW), 2008, 10 pages.
Baseview Products, Inc., AdManager Pro Administrator's Manual v. 2.0, Jun. 1998, 226 pages.
Baseview Products, Inc., ClassManagerPro Administration and Receivables Manual v. 1.0.5, Feb. 1, 1997, 157 pages.
Bay et al., "SURF: Speeded up robust features," *Proc. 9th International European Conference on Computer Vision (ECCV)*, pp. 404-417, 2006.
Belongie et al., "Shape matching and object recognition using shape contexts," *IEEE Transactions on Pattern Analysis and Machine Intelligence (TPAMI)*, vol. 24, No. 24, pp. 509-522, 2002.
Boccaletti et al., "Complex Networks: Structure and Dynamics," *Physics Reports*, 2006, 424:175-308.
Brin and Page, "The Anatomy of a Large-Scale Hypertextual Web Search Engine," *Computer Networks*, 1998, pp. 1-26.
Business Wire, "Global Network, Inc. Enters Into agreement in Principle with Major Advertising Agency," Oct. 4, 1999, 2 pages.
Carson et al., "Blobworld: Image Segmentation Using Expectation-Maximization and Its Application to Image Querying," *IEEE transactions on Pattern Analysis and Machine Intelligence (TPAMI)*, 2002, 24(8):1026-1038.
Chakrabarti et al., "Mining the Web's Link Structure," *IEEE Computer Magazine*, 1999, pp. 60-67.
Dalal and Triggs, "Histograms of Oriented Gradients for Human Detection," *Proc IEEE Conf Computer Vision and Pattern Recognition*, Jun. 2005, pp. 886-893.
Datar et al., "Locality-sensitive hashing scheme based on p-stable distributions," *Proc 20th Symposium on Computational Geometry (SCG)*, pp. 253-262, 2004.
Datta et al., "Image retrieval: Ideas, influences, and trends of the new age," *ACM Computing Surveys*, 2008, 40(2):60 pages.
Dedrick, Interactive Electronic Advertising, IEEE, 1994, pp. 55-66.
Dedrick, A Consumption Model for Targeted Electronic Advertising, Intel Architecture Labs, IEEE, 1995, pp. 41-49.
Dellaert et al., "Mixture Trees for Modeling and Fast Conditional Sampling with Applications in Vision and Graphics," *Proc IEEE Conf Computer Vision and Pattern Recognition*, 2005 at http://www.cs.unc.edu/~kwatra/publications/cvpr05-mixtree.pdf, 6 pages.
Doctorow, "Running Notes from Revenge of the User: Lessons from Creator/User Battles," at http://craphound.com/danahetcon04.txt, as available via the Internet and printed Jul. 28, 2004, 5 pages.
Ebay.com, "What is eBay?" at http://pages.ebay.com/help/welcome/questions/about-ebay.html as available via the Internet and printed on Jul. 29, 2004, 16 pages.
Ebay.com, "How to Bid," at http://pages.ebay.com/help/welcome/bid.html as available via the Internet and printed on Jul. 29, 2004, 2 pages.
Ebay.com, "How to Sell," at http://pages.ebay.com/help/welcome/sell.html as available via the Internet and printed on Jul. 29, 2004, 2 pages.
Facebook Press Release "Users Gain Ability to Share their Action from 44 Participating Sites with their Friends on Facebook" [online] [retrieved on Jan. 24, 2008] [retrieved from the internet: http://www.facebook.com/press/releases.php?p9166] 1 page.
Fergus et al., "A visual category filter for Google images," *Proc. 8th European Conference on Computer Vision (ECCV)*, 2004, pp. 242-256.
Fergus et al., "Object class recognition by unsupervised scale-invariant learning," *Proc. Conference on Computer Vision and Pattern Recognition (CVPR)*, 2003, 2:264-271.
Frey and Dueck, "Clustering by Passing Messages Between Data Points," *Science*, 2007, 315:972-976.
Friedman et al., "Bayesian network classifiers," *Machine Learning*, 1997, 29:131-163.
Frome et al., "Learning globally-consistent local distance functions for shape-based image retrieval and classification," *Proc. 11th IEEE International Conference on Computer Vision (ICCV)*, pp. 1-8, 2007.
Gibson et al., "Inferring Web Communities from Link Topology," *Proc 9th ACM Conference on Hypertex and Hypermedia*, 1998, 10 pages.
Gionis et al., "Similarity Search in High Dimensions via Hashing," *Proc 25th Very Large Database Conf*, 1999 at people.csail.mit.edu/indyk/vldb99.ps, 12 pages.
Glance et al., "Knowledge Pump: Supporting the Flow and Use of Knowledge," *Information Technology for Knowledge Management*, 1997, Borghoff and Pareschi (eds.), Springer Verlag, 22 pages.
Grauman and Darrell, "The Pyramid Match Kernel: Discriminative Classification with Sets of Image Features," *ICCV 2005* at http://people.csail.mit.edu/kgrauman/jobapp/kgrauman_sample_papers. pdf, 9 pages.
Harris and Stephens, "A combined corner and edge detector," *Proc. 4th Alvey Vision Conference*, pp. 147-151, 1988.
Haveliwala, "Topic-Sensitive PageRank," *IEEE Transactions on Knowledge and Data Engineering*, 2003, 10 pages.
He et al., "Imagerank: spectral techniques for structural analysis of image database," *Proc. International Conference on Multimedia and Expo*, 2002, 1:25-28.
Herlocker et al., "Evaluating Collaborative Filtering Recommender Systems," *ACM Transactions on Information Systems*, 2004, 22(1):5-53.
Hsu et al , "Video search reranking through random walk over document-level context graph," *Proc. 15th International Conference on Multimedia*, 2007 pp. 971-980.
Indyk and Motwani, "Approximate Nearest Neighbors: Towards Removing the Curse of Dimensionality," *Proc. 30th ACM Symp. on Computational Theory*, 1998, pp. 604-613.
Indyk, "Stable Distributions, Pseudorandom Generators, Embeddings, and Data Stream Computation," *Proc. 41st IEEE Symposium on Foundations of Computer Science (FOCS)*, pp. 189-197, 2000.
Information Access Technologies, Inc., Aaddzz brochure, "The best Way to Buy and Sell Web Advertising Space," 1997, 6 pages.
Information Access Technologies, Inc., "The Maximum Performance Ad Network." Aaddzz.com website archive from www. Archive.org, 1997, 42 pages.
Jeh and Widom, "SimRank: A Measure of Structural-Context Similarity," *Proc 8th ACM SIGKDD international conference on knowledge discovery and data mining*, Jul. 2002, pp. 538-543.
Jing et al., "Canonical image selection from the web," *Proc. 6th International Conference on Image and Video Retrieval (CIVR)*, pp. 280-287, 2007.
Jing and Baluja, "VisualRank: Applying PageRank to Large-Scale Image Search," *IEEE Transaction on Pattern Analysis and Machine Intelligence*, 2008, 30(11):1877-1890.
Joachims, "Text Categorization with Support Vector Machines: Learning with Many Relevant Features," *Proc 10th European Conf on Machine Learning*, 1998, pp. 137-142.
Joshi et al., "The story picturing engine—a system for automatic text illustration," *ACM Transactions on Multimedia, Computing, Communications and Applications*, 2006, 2(1):68-89.
Kautz et al., "ReferralWeb: Combining Social Networks and Collaborative Filtering," *Communications of the ACM*, 1997, 40(3):1-4.
Ke et al., "Efficient near-duplicate detection and sub-image retrieval," *Proc. ACM International Conference on Multimedia (ACM MM)*, pp. 869-876, 2004.
Ke and Sukthankar, "PCA-SIFT: A More Distinctive Representation for Local Image Descriptors," *Proc. Conference on Computer Vision and Pattern Recognition (DVPR)*, 2004, 2:506-516.

(56) References Cited

OTHER PUBLICATIONS

Kleinberg et al., "The Web as a graph: measurements, models, and methods," *Proc International Conference on Combinatronics*, 1999, 18 pages.
Kleinberg, "Authoritative Sources in a Hyperlinked Environment," *Journal of the ACM*, 1999, 46(5):604-632.
Kondor and Lafferty, "Diffusion kernels on graphs and other discrete structures," *Proc. 19th International Conference on Machine Learning (ICML)*, pp. 315-322, 2002.
Konstan et al., "GroupLens: Applying Collaborative Filtering to Usenet News," *Communications of the ACM*, Mar. 1997, 40(3):77-87.
Lazebnik et al., "A sparse texture representation using affine-invariant regions," *Proc. Conference on Computer Vision and Pattern Recognition (CVPR)*, vol. 2, pp. 319-324, 2003.
Leigh et al., "Transformation, Ranking, and Clustering for Face Recognition Algorithm Comparison," at http://www.itl.nist.gov/div898/itperf/renorm.pdf, 6 pages.
Liew et al., "Social Networks," U.S. Appl. No. 60/552,718, filed Mar. 15, 2004, 9 pages.
Liu et al., "A Comparative Study on Feature selection and Classification methods Using Gene Expression Profiles and Proteomic Patterns," *Genome Informatics* 13:, pp. 51-60, 2002.
Liu et al., "An Investigation of Practical Approximate Nearest Neighbor Algorithms," *Proc Neural Information Processing Systems*, 2004 at http://www.cs.cmu.edu/~tingliu/research.htm, 8 pages.
Lowe, "Distinctive Image Features from Scale-Invariant Keypoints," *International Journal of Computer Vision (IJCV)*, 2004, 60(2):91-110.
Lowe, "Local Feature View Clustering for 3D Object Recognition," *CVPR 2001*, at http:/www.cs.ubc.ca/~lowe/papers/cvpr01.pdf, 7 pages.
Ma and Manjunath, "NeTra: A Toolbox for Navigating Large Image Databases," *Multimedia System*, 1999, 3(7):184-198.
Microsoft Corporation, "Is Friendster the 'Next Big Thing'?" at http://mobilemomentum.msn.com/article.aspx?aid=4, as available via the Internet and printed on Jul. 29, 2004, 2 pages.
Mikolajczyk and Schmid, "A performance evaluation of local descriptors," *IEEE Transactions on Pattern Analysis and Machine Intelligence (TPAMI)*, 2005, 27(10):1615-1630.
Monay and Gatica-Perez, "On Image Auto-Annotation with Latent Space Models," *MM'03*, Nov. 2-8, 2003, 4 pages.
Multiply, "About Multiply," at http://multiply.com/info/about, as available via the Internet and printed on May 3, 2004, 2 pages.
Multiply, "Help," at http://multiply.com/info/help, as available via the Internet and printed on May 3, 2004, 2 pages.
Multiply, "Multiply Privacy Policy," at http://multiply.com/info/privacy, as available via the Internet and printed on May 3, 2004, 4 pages.
Multiply, "Multiply Terms of Service," at http://multiply.com/info/tos, as available via the Internet and printed on May 3, 2004, 6 pages.
Nistér and Stewénius, "Scalable recognition with a vocabulary tree," *Proc. Conference on Computer vision and Pattern Recognition (CVPR)*, vol. 2, pp. 2161-2168, 2006.
Nowak and Jurie, "Learning visual similarity measures for comparing never seen objects," *Proc. Conference on Computer Vision and Pattern Recognition (CVPR)*, 2007, 8 pages.
Park et al., "Majority based ranking approach in web image retrieval," *Lecture Notes in Computer Science*, vol. 27-28, pp. 499-504, 2003.
Pentland et al., "Photobook: Content-based manipulation of image databases," *International Journal of Computer Vision (IJCV)*, 1996, 18(3):233-254.
Philbin et al., "Object retrieval with large vocabularies and fast spatial matching," *Proc. Conference on Computer Vision and Pattern Recognition (CVPR)*, 2007, 8 pages.
Pilászy, "Text Categorization and Support Vector Machines," *Computer Science*, 1998, vol. 1398, 10 pages.
Press Releases Facebook "Leading Websites Offer Facebook Beacon for Social Distribution" [online] [retrieved from the Internet: http://www.facebook.com/press/releases.php?p9166] retrieved on Jan. 24, 2008, 1 page.
Roach et al., "Video Genre Classification Using Dynamics," 2001, *Proc Acoustics, Speech, and Signal Processing on IEEE Intl Conference*, pp. 1557-1560.
Rothganger et al., "3D Object Modeling and Recognition Using Affine-Invariant Patches and Multi-View Spatial Constraints," *CVPR 2003*, at http://vasc.ri.cmu.edu/~hebert/04AP/fred_cvpr03.pdf, 6 pages.
Rowley et al., "Neural Network-Based Face Detection," *IEEE Transactions on Pattern Analysis and Machine Intelligence*, 1998, 20(1):28 pages.
Schindler et al., "City-Scale Location Recognition," *Proc. Conference on Computer Vision and Pattern Recognition (CVPR)*, 2007, 7 pages.
Sebastiani, "Machine Learning in Automated Text Categorization," *ACM Computing Surveys*, 2002, 34(1):1-47.
Simon et al., "Scene summarization for online image collections," *Proc. 12th International Conference on Computer Vision (ICCV)*, 2007, 8 pages.
Smeulders et al., "Content based image retrieval at the end of the early years," *IEEE Transactions on Pattern Analysis and Machine Intelligence (TPAMI)*, 2000, 22(12):1349-1380.
Sullivan, Danny, "Is It Really Personalized Search?" http://searchenginewatch.com printed on May 13, 2004, 1 page.
Szummer and Jaakkola, "Partially labeled classification with Markov random walks," *NIPS 2001*, 8 pages.
Tribe.net, "Listings Directory," at http://www.tribe.net/tribe/servlet/template/pub.Listings.vm, as available via the Internet and printed on Jun. 28, 2004, 2 pages.
Uchihashi and Kanade, "Content-free image retrieval by combinations of keywords and user feedbacks," *Proc. 5th International Conference on Image and Video Retrieval (CIVR)*, pp. 650-659, 2005.
Viola and Jones, "Robust Real Time Face Detection," *Int J Computer Vision*, 2004 at http://scholar.google.com/scholar?hl=en&lr=&cluster=10098362814192689387, 1 page.
Wang et al., "AnnoSearch: Image Auto-Annotation by Search," *CVPR 2006*, 8 pages.
Weinberger et al., "Distance metric learning for large margin nearest neighbor classification," *Proc. 18th Conference on Advances in Neural Information Processing Systems (NIPS)*, vol. 18, pp. 1437-1480, 2006.
Winder and Brown, "Learning local image descriptors," *Prof. Conference on Computer Vision and Pattern Recognition (CVPR)*, 2007, 8 pages.
Xing et al., "Distance metric learning, with applications to clustering with side-information," *Proc. 15th Conference on Advances in Neural Information Processing Systems (NIPS)*, 2002, 15:450-459.
Yang et al., "Mining Social Networks for Targeted Advertising," *Proceedings of the 39th Hawaii International Conference on System Sciences*, 2006.
Yang and Pedersen, "A Comparative Study on Feature Selection in Text Categorization Source," *Proc 14th Intl Conf Machine Learning*, 1997, pp. 412-420.
Zeff et al., *Advertising on the Internet*, 2nd ed., John Wiley & Sons, 1999.
Zhang. 'Facebook unveils school-specific advertisements' [online] The Stanford Daily, 2005, [retrieved on Aug. 16, 2010]. Retrieved from the Internet: http://www.stanforddaily.com/2005/01/06/facebook-unveils-school-specific-advertisements/ , (Jan. 6, 2005) 1 page.
Zhou and Schölkopf, "Learning from Labeled and Unlabeled Data Using Random Walks," *Lecture notes in computer science*, 2004, Springer, 8 pages.
Zhu et al., "Semi-Supervised Learning Using Gaussian Fields and Harmonic Functions," *Proc. 20th Intl Conf on Machine Learning*, 2003, 8 pages.
Zhu, "Semi-Supervised Learning with Graphs," 2005, Doctoral Thesis, Carnegie Mellon University, 174 pages.
International Search Report/Written Opinion in PCT/US2008/062263 mailed Jan. 7, 2008, 13 pages.
International Preliminary Report on Patentability in PCT/US2008/062263 mailed Nov. 12, 2009, 7 pages.
International Search Report/Written Opinion in PCT/US2008/62285 mailed Dec. 5, 2008, 12 pages.
International Preliminary Report on Patentability in PCT/US2008/62285 mailed Nov. 12, 2009, 8 pages.

DETECTING CONTENT ON A SOCIAL NETWORK USING BROWSING PATTERNS

CROSS-REFERENCE TO RELATED APPLICATION

This application is a continuation of and claims priority under 35 U.S.C. §120 to U.S. application Ser. No. 12/571,822, filed on Oct. 1, 2009, the entire contents of which is incorporated herein by reference.

TECHNICAL FIELD

This document generally describes methods and systems for detecting content on a social network.

BACKGROUND

The present disclosure generally relates to detecting content contained on a social network of users. A social network can be an online system that provides a forum for users who are geographically separated to interact with one another. Social networks can be aimed at various aspects of social interaction, such as friendship and business networking.

In general, a user of a social network has a profile page that is customizable by the user. A user can post content, such as text, images, and video, to its profile page. Detection of content posted to profile pages on a social network, e.g., to root out inappropriate content, has included manual review of profile pages.

SUMMARY

This document describes techniques, methods, and systems for detecting content contained on a social network of users. In general, content pertaining to a particular subject of interest can be detected on a social network based upon user browsing patterns. More specifically, users that have viewed content already identified as pertaining to a particular subject at one location on the social network (e.g., a user's profile page) may be likely to view similar content at other locations on the social network (e.g., other users' profile pages). User browsing patterns can point from content that has already been identified as pertaining to the particular subject of interest to undetected content that pertains to the particular subject of interest. Based upon browsing patterns, a likelihood that other profile pages on a social network contain content pertaining to a particular subject of interest can be determined.

For example, assume that a profile page for user U1 has already been identified as containing images and videos regarding sports and that detection of other profile pages containing content regarding sports is desired. Assume further that users U2-U10 have viewed both the profile page for user U1 and a profile page for user U11. The profile page for user U11 can be detected as (likely) containing content related to sports based upon the users U2-U10 viewing both the profile page for user U1 and the profile page for user U11—the browsing patterns of the users U2-U11 can provide a connection between the two profile pages.

In one implementation, a computer-implemented method includes receiving at a first server system information related to users of a social network site hosted on a second server system and determining by the first server system a graph for at least a portion of the social network from the received information, the graph including a plurality of nodes connected by directional links where each node corresponds to a user having a profile page on the social network and where each directional link corresponds to a user of the social network, represented by a node, viewing at least an aspect of a profile page for another user, represented by another node. The method can further include identifying first nodes from the plurality of nodes as including content associated with a particular subject of interest, and seeding the identified first nodes with first scores that indicate profile pages corresponding to the identified first nodes are positively identified as including content associated with the particular subject of interest. The method can also include determining second scores for second nodes of the plurality of nodes that indicate a likelihood that the second nodes contain content that is associated with the particular subject of interest, by propagating the first scores across the social graph to the second nodes, wherein the first scores are propagated across the social graph and the second scores are determined based upon third nodes of the plurality of nodes that have directional links that indicate that users corresponding to the third nodes viewed aspects of profile pages associated with the first nodes and the second nodes; and providing by the first server the determined second scores for the second nodes.

In another implementation, a system for detecting profile pages on a social network as including content associated with a particular subject of interest includes one or more servers and an interface for the one or more servers that receives information related to users of a social network site hosted a server system. The system can additionally include a social graph linking module configured to determine a graph for at least a portion of the social network from the information received by the interface, the graph including a plurality of nodes connected by directional links where each node corresponds to a user having a profile page on the social network and where each directional link corresponds to a user of the social network, represented by a node, viewing at least an aspect of a profile page for another user, represented by another node. The system can also include a score seeding component that identifies first nodes from the plurality of nodes as including content associated with a particular subject of interest and seeds the identified first nodes with first scores that indicate first profile pages corresponding to the identified first nodes are positively identified as including content associated with the particular subject of interest. The system can additionally include an iterative score propagation module that is configured to determine second scores for second nodes of the plurality of nodes that indicate a likelihood that the second nodes contain content that is associated with the particular subject of interest, by propagating the first scores across the social graph to the second nodes, wherein the first scores are propagated across the social graph and the second scores are determined based upon third nodes of the plurality of nodes that have directional links that indicate that users corresponding to the third nodes viewed aspects of profile pages associated with the first nodes and the second nodes. The system can also include a content detection module that is configured to provide the determined second scores for the second nodes.

In another implementation, a system for detecting profile pages on a social network as including content associated with a particular subject of interest includes one or more servers and an interface for the one or more servers that receives information related to users of a social network site hosted a server system. The system can also include a social graph linking module configured to determine a graph for at least a portion of the social network from the information received by the interface, the graph including a plurality of nodes connected by directional links where each node corresponds to a user having a profile page on the social network and where each directional link corresponds to a user of the social network, represented by a node, viewing at least an aspect of a profile page for another user, represented by another node. The system can further include a score seeding component that identifies first nodes from the plurality of nodes as including content associated with a particular subject of interest and seeds the identified first nodes with first scores that indicate first profile pages corresponding to the identified first nodes are positively identified as including content associated with the particular subject of interest. The system can also include means for detecting profile pages on a social network as including content associated with a particular subject of interest that is configured to determine second scores for second nodes of the plurality of nodes that indicate a likelihood that the second nodes contain content that is associated with the particular subject of interest, by propagating the first scores across the social graph to the second nodes, wherein the first scores are propagated across the social graph and the second scores are determined based upon third nodes of the plurality of nodes that have directional links that indicate that users corresponding to the third nodes viewed aspects of profile pages associated with the first nodes and the second nodes. The system can additionally include a content detection module that is configured to provide the determined second scores for the second nodes.

Particular embodiments can be implemented to realize one or more of the following advantages. Content can be detected on a social network with greater efficiency. Instead of relying upon manual review of the pages of a social network, pages that likely contain content can be quickly located based upon browsing patterns. A greater amount of content can be located on a social network in less time than under traditional manual review. Additionally, detection of content on the social network permits for a high degree of accuracy by distinguishing between browsing patterns that are indicative of the presence of content associated with a particular subject on a profile page and browsing patterns that are not. Furthermore, detecting content based on user browsing patterns on a social network can have greater accuracy and efficiency than other automated techniques, such as content-based detection techniques.

The details of one or more embodiments are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

Figure 1A:
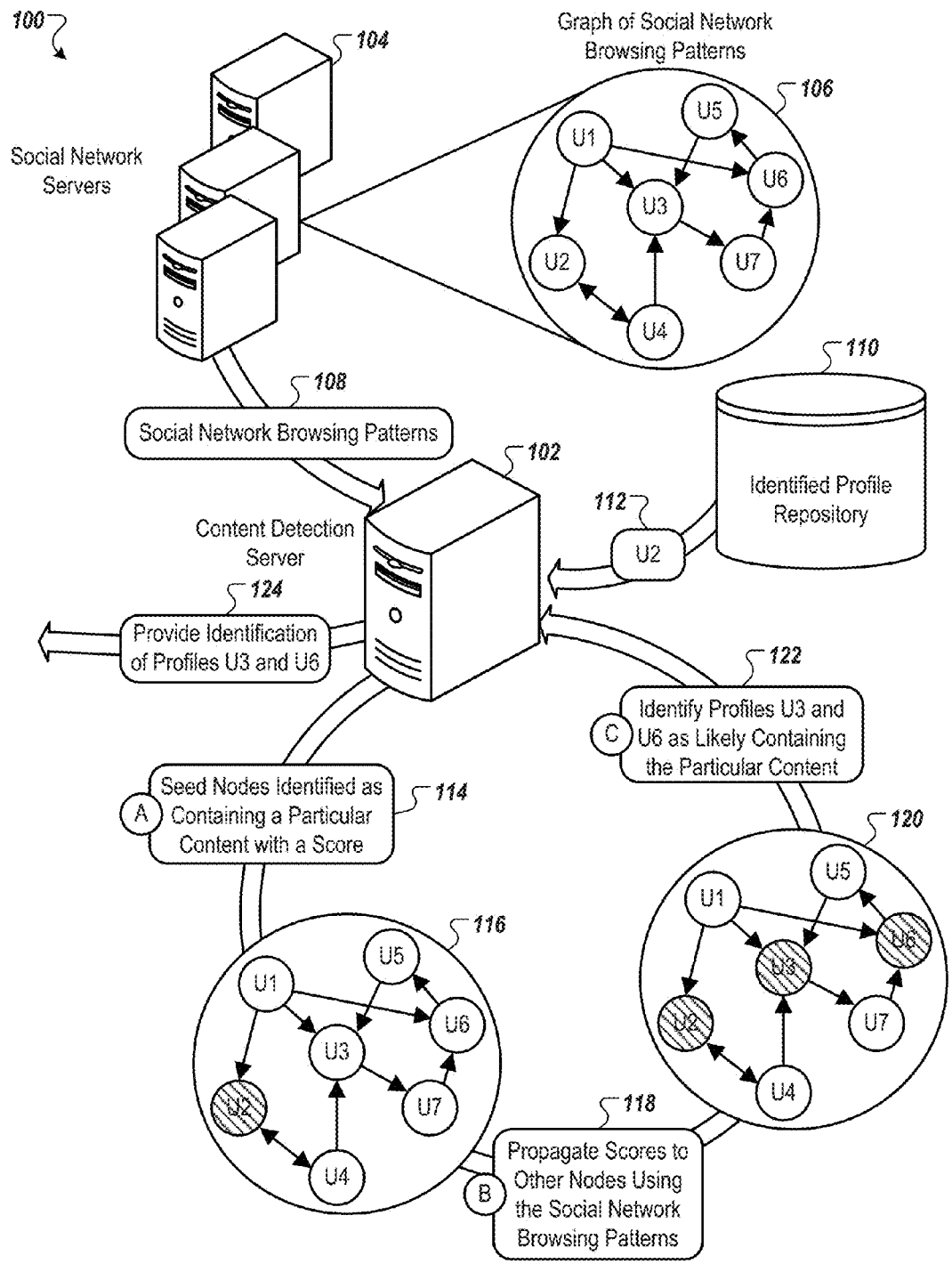
FIG. 1A is a conceptual diagram of an example system for detecting content on a social network using browsing patterns.

This document describes techniques, methods, and systems for detecting content contained on a social network of users. Social networks (e.g., FACEBOOK, MYSPACE, ORKUT, TWITTER, LINKEDIN, YOUTUBE, etc.) provide an electronic environment within which users can interact with one another. Users of a social network generally have at least one corresponding profile page. A user of a social network can customize his/her profile page on the social network. User customization of a profile page can include posting images, text, videos, graphics, games, interactive applications, etc. Depending on the social network, user profile pages and the customized content contained therein can be viewed by other users and/or the general public. Generally, users are able to add content to their profile pages for other users to see without the content having to first be accurately classified (e.g., tagged) as pertaining to a particular subject and/or approved by the social network. While this is desirable for users of a social network, it can be problematic for social networks.

For example, a social network may desire to provide advertising that is related to the content on a user's profile page. However, without a designation (e.g., content tag, content classification, etc.) associated with customized content added by users, the social network may not be able to accurately provide such content-related advertising. In another example, users of a social network may post content that is illegal (e.g., content violating copyright law, content violating penal statutes, etc.), inappropriate for minors (e.g., pornography, "R" or "NC-17" rated videos, adult content, etc.), in contravention of an end user licensing agreement (EULA), etc. Attempts by a social network to remove and/or filter content that is illegal, age inappropriate, in violation of EULA, etc. can be stifled by a lack of accurate classifications for user-added content.

Social networks can attempt to detect the potentially problematic content through content analysis. However, detecting content pertaining to a particular subject of interest (e.g., advertisement-related content, illegal content, content that is inappropriate for minors, content in violation of EULA, etc.) on a social network by analyzing the content itself can be a difficult task given the large amount of ever-changing user-posted content that is contained on a social network. Additionally, detecting content through content analysis can be complicated by the large amount of image-based content (e.g., photos, graphics, videos, games, etc.) on a social network for which detection is less accurate and more processor-intensive.

This document discloses various improved techniques, methods, and systems for detecting content pertaining to a particular subject of interest based upon user browsing patterns. The various disclosed techniques, methods, and systems can utilize user browsing patterns as pointers to profile pages that likely contain content of interest. Browsing patterns for users of a social network can include the pages of a social network that a user views, such as profile pages of other users, community pages, forums, etc. Users of a social network may be likely to seek out and browse to similar content across the social network. A user viewing a page with content known to pertain to a particular subject of interest can indicate that the additional pages that the user views also contain pertaining to the particular subject of interest. User browsing patterns can be used to propagate classifications (e.g., illegal content, inappropriate content for minors, content related to sports, etc.) for content that has already been identified as pertaining to a particular subject of interest to other content for which a classification is unknown.

For example, assume that a profile page for user U1 contains content classified as pertaining to music (e.g., user U1's profile page contains pictures of musicians) and that it is unknown whether a profile page for user U2 contains content related to music. If users U3-U10 viewed user U1's profile page and user U2's profile page, then the browsing patterns of users U3-U10 (viewed profile pages for users U1 and U2) can indicate that user U2's profile page likely contains content related to music—a classification associated with user U1's profile page can be propagated to user U2's profile page. The browsing patterns of users U3-U10 and the classification of user U1's profile page can be analyzed to determine a likelihood that the profile page for user U2 contains content relating to music.

FIG. 1A is a conceptual diagram of an example system 100 for detecting content on a social network using browsing patterns. The depicted example system 100 includes a content detection server 102 that identifies pages (e.g., user profile page, social group page, forum, etc.) of the social network that are likely to contain content associated with a particular subject (e.g., content related to an advertisement, adult content, etc.) of interest based upon user browsing patterns (e.g., profile page views, group page views, forum page posts, etc.) on a social network. The social network for which the content detection server 102 identifies content can be hosted by social network servers 104.

The social network servers 104 can host any variety of social networks. For example, the social network servers 104 can host a friendship-oriented social network (e.g., FACEBOOK, MYSPACE, ORKUT, etc.), a business-oriented social network (e.g., LINKEDIN, etc.), a blog-oriented social network (e.g., TWITTER, etc.), etc. The social network servers 102 store an array of information regarding content posted to and activity on the social network, including user browsing patterns. A browsing pattern for a user can include pages of the social network (e.g., profile pages, group pages, forums, etc.) and other content on the social network (e.g., text, image, video, game, etc.) that the user has viewed. For example, a user's browsing pattern can be a log of social network pages that the user requested from the social network servers 104. The social network servers 104 can capture user browsing patterns by pairing requests for pages and other content on the social network with information that identifies the user requesting the information (e.g., user login information, information stored in a session/cookie that identifies a user, etc.).

User browsing patterns stored by the social network servers 104 can be assembled into a graph of social network browsing patterns 106. In the example graph 106 that is depicted, the nodes labeled U1-U7 represent users of the social network. The nodes for users U1-U7 are connected by directional links (e.g., arrows). In this example, the directional links indicate that a user of the social network has viewed a profile page or other content associated with another user of the social network. For instance, the directional link that points from user U1 to user U2 indicates that the user U1 has viewed (e.g., requested from the social network servers 104) a profile page or other content associated with the user U2.

The social network servers 104 provide social network browsing patterns 108 for users of the social network to the content detection server 102. As described above, the content detections server 102 uses the browsing patterns 108 to detect content on the social network of users.

Additionally, the content detection server 102 receives information 112 regarding profiles that have been positively identified as containing content associated with a particular subject of interest from an identified profile repository 110. The content detection server 102 uses the received information 112 in conjunction with the browsing patterns 108 to detect content on the social network. The received information 112 can be specific to a particular subject of interest (whereas the browsing patterns 108 can be generic). For instance, if the content detection server 102 is attempting to identify profile pages that likely contain content associated with downhill skiing, the identified profile repository 110 can provide pages of the social network already identified as containing content related to downhill skiing. The identified profile repository 110 can include information regarding associations between users of the social network and one or more of a variety of subjects of interest, such as music, sports, adult content, content in contravention of a EULA, etc. In the depicted example, the information 112 indicates that the profile page associated with the user U2 has been identified having content associated with the particular subject of interest.

The identified profile repository 110 can be populated with identified profiles in a variety of ways. For example, profiles can be identified and added to the repository 110 based upon manual review of profile pages (e.g., profile manually reviewed by social network administrator in response to being flagged by other users), based upon a user adding content that is known/verified to pertain to a particular subject (e.g., user selects "share on social network" link/button on a news website regarding a news article verified by the news website as pertaining to a particular subject), based upon the profile having previously been identified by the content detection server 102, etc.

For instance, assume user U2 for the social network visits a website "www.classicalmusic.org" and selects a link/button to share a promotional video for an upcoming concert on the social network. The "www.classicalmusic.org" website can provide verification that the promotional video that is being shared on user U2's profile page does in fact pertain to classical music. For instance, meta-data (e.g., tags) associated with the promotional video can be analyzed to verify content associated with the video. In another example, labels can be provided by the classicalmusic.org website that can be used to verify content when seeding nodes of a social graph (as described below in further detail). Based upon such verification, the user U2 can be positively identified as having content associated with classical music and can be added to the identified profile repository 110 with such an association.

To detect content on the social network, the content detection server 102 can construct a graph, similar to the graph 106, using the received social network browsing patterns 108. The constructed graph can be used to identify relationships that may exist between users of the social network as indicated by browsing patterns. For example, referring to the graph 106, the users U2 and U3 may have similar content on their profile pages based upon the users U1 and U4 having viewed both of their profile pages.

Using the received information 112 that identifies user U2 has having a profile page that contains content associated with a subject of interest, the content detection server 102 can seed the node associated with the user U2 with a score (114). The score can indicate that the profile page of the user U2 contains content associated with the subject of interest. As depicted in social graph 116, the node for user U2 is seeded with a score (as represented by the shading of U2).

The content detection server 102 can propagate the seeded score to other users of the social network using the browsing patterns as depicted in the graph 116 (118). Scores can be propagated to other users of the social network in a variety of ways, as described in more detail below. Generally, a propagated score for a user that shares a larger number of common page views with an identified user will likely be greater than a propagated score for a user sharing a smaller number of common page views. For instance, a score propagated from user U2 to user U3 will likely be greater than a score propagated from user U2 to U6 based upon there being more common views of pages for U2 and U3 (by users U1 and U4) than common views of pages for U2 and U6 (by U1 only).

As depicted in the example graph 120, the nodes for users U3 and U6 are shaded in addition to the node for user U2. The shading for users U3 and U6 indicates that a high score (in relation to the other nodes in the graph 120) was propagated from the node U2. The high score was propagated to user U3 based upon users U1 and U4 viewing the profile pages for users U2 and U3. The high score was propagated to user U6 based upon user U1 viewing the profile pages for users U2 and U6.

Content can be detected using viewing scores and content owner scores for each of the nodes of the graph 120. A viewing score can be a score for a node based upon the scores of other nodes that were viewed by the node (as indicated by the directional links). An owner score can be a score for a node base upon the scores of other nodes that viewed the node. Content can be detected based upon the owner scores for nodes. A node can have both an owner score (for content viewed by other users from the associated user) and a viewer score (for content viewed by the user from other users).

For example, the node for user U2 can be seeded with an owner score. The owner score for U2 can then be propagated to nodes for U1 and U4 as viewer scores. The viewer scores for U1 and U4 can then be propagated to nodes for U3 and U6 as owner scores. Content pertaining to the particular subject of interest can be detected based upon the owner scores propagated to nodes U3 and U6.

Based upon the propagated scores, the profiles for users U3 and U6 can be identified as likely containing content associated with the particular subject (122). The content detection server 102 can determine whether a propagated score indicates a likelihood of a profile page containing content associated with the particular subject of interest using a variety of techniques, such as a propagated score threshold (e.g., scores greater than the threshold indicate the associated profile page is likely to contain the content of interest), selecting the nodes with the top N scores (e.g., top 2 nodes, top 1% of nodes, etc.), etc.

The content detection server 102 provides the identified profiles U3 and U6 as output (124). The identified profiles U3 and U6 can be provided to a client that requested content detection on the social network. For example, the social network servers 104 can request content be detected by the content detection server 102 for a variety of reasons (e.g., identify content in contravention of the EULA, etc.) and can be provided with information identifying users U3 and U6. Depending on the circumstances surrounding the request from the social network servers 104, a variety of actions can be taken with regard to users U3 and U6 (e.g., target for advertising, lock or restrict access to profile pages, etc.).

In another example, an advertiser's request to target ads at users having content related to a particular topic can be routed to the content detection server 102. Such a request may come a variety of sources, such as directly from the advertiser (not depicted), through another server (not depicted) that provides opportunities to advertise to users of the social network, etc. The information regarding the identified users U3 and U6 can be used to target those users with advertising on behalf of the advertiser.

Figure 1B:
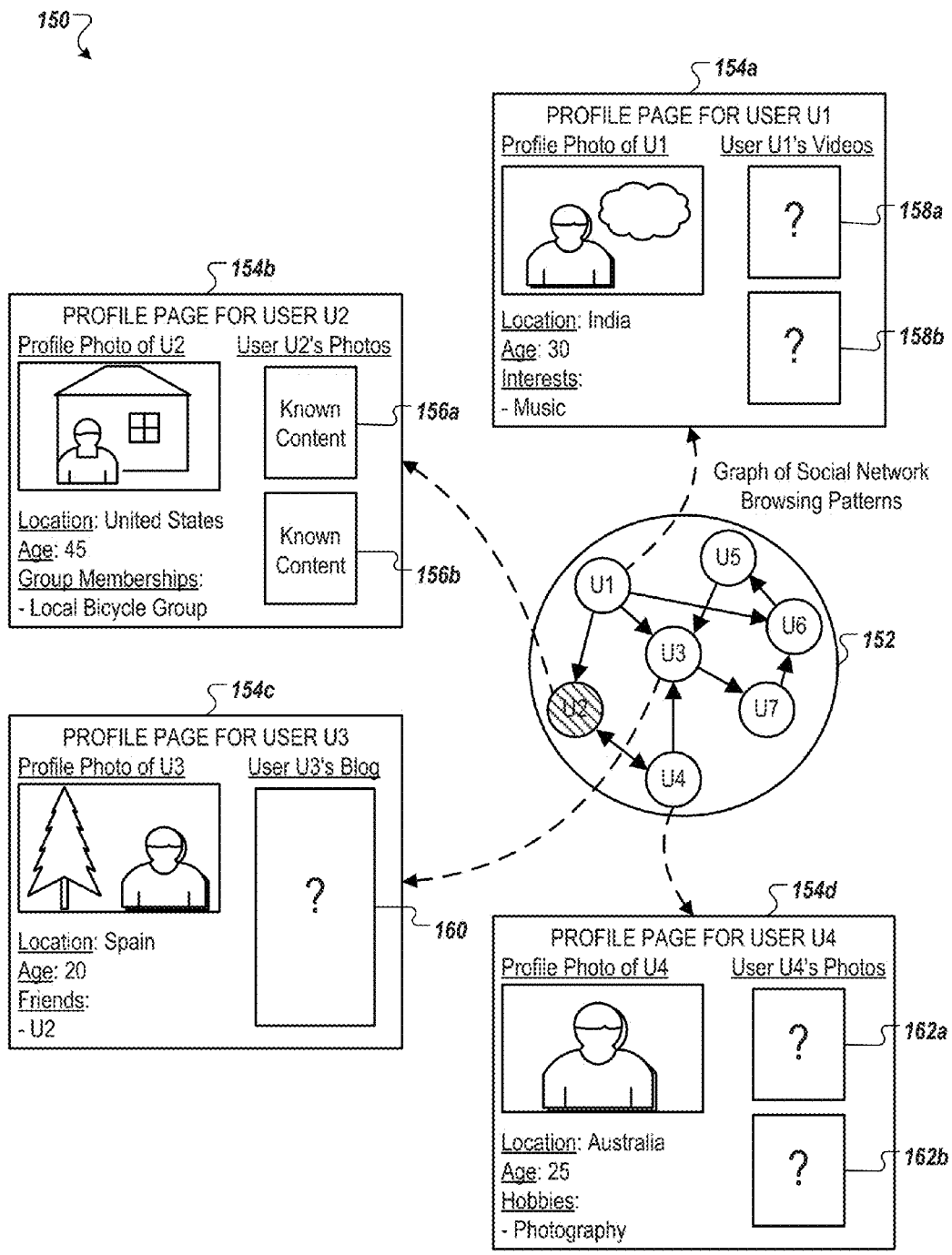
FIG. 1B is a conceptual diagram of profile pages represented by nodes of an example graph of social network browsing patterns.

FIG. 1B is a conceptual diagram 150 of profile pages 154a-d represented by nodes of an example graph 152 of social network browsing patterns. The graph 152 and the profile pages 154a-d illustratively demonstrate that subjects associated with content (e.g., text, photos, videos, etc.) on the profile pages 154a-d is generally unknown (or unverified) to a content detection server (e.g., the content detection server 102). Using any of the various techniques described above and below, a content detection server can illuminate the subject matter for at least some of the unknown content contained on profile pages 154a-d. The example graph 152 is similar to the graphs 106, 116, and 120, as described above with regard to FIG. 1A. The graph 152 can be derived from user browsing patterns on a social network and can be used by a content detection server (e.g., the content detection server 102) to detect content on the social network.

As described above, profile pages for users of a social network can vary greatly depending on the social network (e.g., friendship network, business networking, etc.) and the type of content users are permitted to post. The profile pages 154a-d are presented as simplified examples of profile pages. Each of the profile pages 154a-d corresponds to one of the users U1-U4. As demonstrated by the varied fields of the profile pages 154a-d (e.g., page 154a presents videos and page 154b presents photos), the type of content presented on a profile page can vary depending on user configuration of the profile page.

Similar to the graphs presented above with regard to FIG. 1A, the graph 152 provides directions links between the nodes that indicate one user viewed a profile page or content associated with another user. For example, an arrow from user U1 to user U2 indicates that the user U1 viewed the profile page 154b or content contained in the profile page 154b (e.g., photos 156a-b).

Extending the example from FIG. 1A regarding user U2 being identified as having content a profile page 154b with content associated with a particular subject of interest, the photos 156a-b are indicated as being "known content"— meaning the photos 156a-b are known to positively pertain to the particular subject. However, the question marks ("?") provided in content 158-162 for profile pages 154a and 154c-d indicates that a subject associated with the content 158-162 is unknown (e.g., no tag associated with the content) or unverified (e.g., the validity of a tag associated with the content has not been confirmed by a reputable source). For instance, a subject associated with the videos 158a-b posted on the user U1's profile page 154a are unknown, a subject associated with the blog 160 (which may contain a variety of content such as text, hyperlinks to other content, photos, videos, games, etc.) posted on the user U3's profile page 154c is unknown, and a subject associated with the photos 162a-b posted on the user U4's profile page 154d is unknown.

A content detection server, such as the content detection server 102 described above, can resolve at least some of the uncertainty associated with the subject associated with the content 158-162 by performing the content detection techniques described above and below with regard to the graph 152. For example, as demonstrated above with regard to FIG. 1A, the browsing patterns can indicate that the profile page 154c for user U3 is likely to contain content (e.g., the blog 160) associated with the particular subject of interest.

Figure 2:
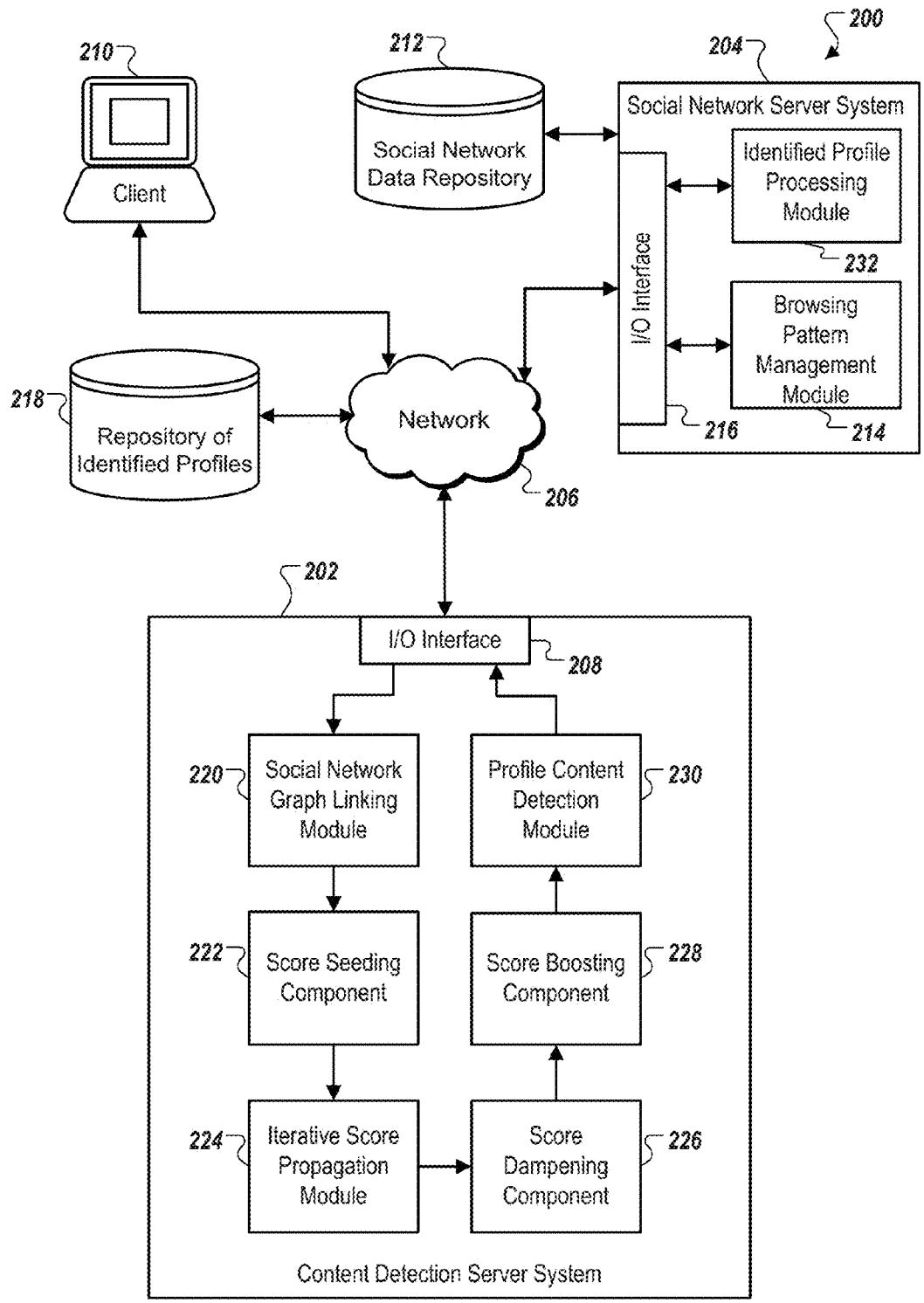
FIG. 2 is a diagram of an example system for detecting content on a social network based upon user browsing patterns.

FIG. 2 is a diagram of an example system 200 for detecting content on a social network based upon user browsing patterns. The system 200 is similar to the system 100 discussed above with regard to FIG. 1A. The system 200 includes a content detection server system 202 that detects content on a social network based upon user browsing patterns and pages of the social network positively identified as containing content associated with the subject at issue. The content detection server system 202 can be any of a variety of server systems, such as a dedicated server system, a distributed server system, a collocated server system, etc.

To detect content on a social network, the content detection system 202 interacts with a social network server system 204 over a network 206 (e.g. a LAN, a WAN, the Internet, an intranet, a wireless connection, a communicative coupling, etc.). Similar to the social network servers 104 described above with regard to FIG. 1A, the social network server system 204 can host the social network for which the content detection server system 202 is attempting to detect content.

The content detection server system 202 receives a request to locate content on the social network hosted by the social network server system 204 at an input/output (I/O) interface 208. The request can specify a particular subject of interest to be located on the social network. The I/O interface 208 can be any variety of interface capable of communicating with other computing devices over the network 206, such as a wireless network card, an Ethernet card, a telephone modem, etc. The content detection server system 202 can receive the request from a variety of sources, such as the social network server system 204, a client computer 210, etc. The client computer 210 (e.g., laptop, desktop computer, cell phone, PDA, etc.) can be various entities, such as an advertiser, an advertising server system, a backend computing system for the social network server system, an owner of intellectual property (e.g., copyright holder), a government agency (e.g., law enforcement attempting to locate illegal activity, etc.), etc.

To process the request, the content detection server system 202 obtains user browsing patterns from the social network server system 204. Among a variety of other data regarding the social network hosted by the social network server system 204, the browsing patterns can be stored in a social network data repository 212 (e.g., database, file system, etc.). A browsing pattern management module 214 that is part of the social network server system 204 can retrieve the browsing patterns from the social network data repository 212 and provide them to the content detection server system 202 through the network 206 using an I/O interface 216. The I/O interface 216 can be similar to the I/O interface 208.

The content detection server system 202 can additionally receive information regarding profile pages (or other pages) of the social network that are positively identified as pertaining to the subject of the request. Such information can be retrieved from a repository of identified profiles 218 (e.g., database, file system, etc.) over the network 206. In some implementations, the repository of identified profiles 218 is part of or connected to the social network server system 204. In some implementations, the repository of identified profiles 218 is part of or connected to the content detection server system 202. In other implementations, the repository of identified profiles 218 is accessible over the network 206 as part of a freestanding system (e.g., a database server system, a file server system, etc.).

Using a social network graph linking module 220, the content detection server system 202 constructs a graph from the received user browsing patterns. The graph can include nodes that correspond to users of the social network and directional links that connect the nodes, similar to the graphs described above with regard to FIGS. 1A-B. A score seeding component 222 can seed nodes that have been positively identified as pertaining with requested subject (as indicated by the information received from the repository of identified profiles 218) with a score that indicates such an identification (e.g., step 114 described above with regard to FIG. 1A).

An iterative score propagation module 224 can propagate the seeded scores to other nodes of the created social graph based upon the received user browsing patterns (e.g., step 118 described above with regard to FIG. 1A). A variety of propagation techniques can be used by the iterative score propagation module 224. In one example technique, the iterative score propagation module 224 can propagate 10% of the seeded score to another node for each common viewer (e.g., a user that viewed content on both the seeded node's profile page and the other node's profile page) the seeded node and the other node have in common (up to a maximum of the seeded score). For instance, if a seeded node has a score of 100 and it shares two common viewers with a first node, then a score of 20 (20% of 100) can be propagated to the first node. The score can be propagated throughout the social network through any number of iterations (e.g., one iteration, two iterations, four iterations, five iterations, eight iterations, etc.). For instance, if two iterations are used, then the score of 20 propagated to the first node can be propagated to other nodes (e.g., a second node) that share common viewers with the first node.

A score dampening component 226 can be used to adjust scores for nodes based upon the proximity of nodes (to which a score was propagated) to seeded nodes. Nodes that are further away from a seeding node in the social network browsing pattern graph can have their scores dampened (decreased) by a greater amount than nodes that are closer to the seeding node. For instance, a first node that did not receive a score until the third iteration of score propagation can have its score dampened by a greater amount than a second node that received a score in the first iteration. Nodes that are further away from a seeding node can be less likely to have content related to the subject of interest (e.g., subject received with the request) than nodes that are closer to the seeding node.

One example technique that can be used by the score dampening component 226 includes multiplying the propagated score by a dampening value (e.g., a number between 0.0 and 1.0, inclusive) that is inversely related to the number of iterations (also referred to as node depth) at which a score was propagated to a node. For example, a first node that has a depth of one (score propagated to the first node in the first iteration) can be dampened using a greater dampening value than a second node that has a depth of three (score propagated to the second node in the third iteration)—meaning the score for the first node will be dampened (decreased) less than the score for the second node.

The dampening value can be computed in a variety of manners. For example, the dampening value can be a dampening factor to the power of the depth for a node (dampening value=dampening factor A node depth). As described above, the depth for a node is the iteration at which a score (e.g., a viewing score, an owner score) is first propagated to the node. The dampening factor can be a value that is less than 1.0 (e.g., 0.95, 0.9, 0.8, 0.75, 0.6, 0.5, etc.). The dampening factor can vary for a social network depending on a variety of factors, such as the type of social network, the type links between users in the social graph (e.g., explicit acquaintance relationships, implicit acquaintance relationships, etc.), a likelihood that users of the social network that are not directly connected with by a link indicate something about each other (e.g., a likelihood of content pertaining to the particular subject of interest being present on a distant user's profile page), etc.

A score boosting component 228 can be used to boost (increase) scores for nodes viewed by users strongly associated with the subject of interest (e.g., users that viewed content from profile pages associated with the seeded nodes) but for which the score may have been diluted by a large proportion of naïve users (e.g., viewers with little or no association with the subject of interest). Views by a few strongly associated users can be more indicative of content contained on a profile page than views by a larger number of users that are naïve to the subject of interest. By boosting the score for such nodes, such a diluting effect can be counteracted to more accurately reflect the likelihood that such a node contains content associated with the particular subject of interest.

For instance, assume that a score propagated to a first node is determined by averaging the scores contributed by each node that viewed first node. Further assume that the first node was viewed by users U1-U10 that are strongly associated with the subject of interest (e.g., each of the users U1-U10 had page views in common with nodes positively identified as being related to the subject of interest), but was also viewed by users U11-U100 that have no association with the subject of interest (e.g., users U11-U100 did not view any pages identified as containing content related to the subject of interest). In such an instance, the views by users U1-U10 may be diluted by the lack of views for users U11-U100 in the propagated score for the first user. By boosting the score for the first user based upon the views of users U1-U10, the propagated score for the first user can more accurately reflect the likelihood the profile page for the first user contains content associated with the particular subject of interest.

One example boosting technique employs a function that uses a logarithmic relationship between the number of directional links to a node (e.g., views by other users) and the amount by which a score is boosted. By using a function with a logarithmic relationship, the function is able to account for large variations (e.g., variations by a factor of 10, 100, 1000, etc.) in the number of directional links that may be present for users.

The example function can be: score(node)=score(node)*(((log(number of views)/log(denominator))*(multiplier−1))+1). The "score(node)" can be the score for a node during/after propagation and/or dampening of scores for the node. The "number of views" can be a number of nodes that are indicated as having viewed a node. The "denominator" can be a value that represents an enormous number of directional links (views) for a user on a social network (e.g., 1,000; 10,000; 100,000; 1,000,000; etc.). The denominator can vary from each social network base upon a variety of factors, such as a number of users, a number of links between users, the greatest number of links for a single users, the ease with which links can be established between users, etc.

The "multiplier" can be a fixed number (e.g., 0.1, 0.25, 0.67, 1.10, 1.25, 1.4, 1.9, 2.5, etc.) or a determined value. For instance, the multiplier can be a value determined by the following function: multiplier(node)=numerator/score(node)−1. The numerator can be a value such that nodes with relatively small scores will receive a greater multiplier than nodes that have relatively large scores. For example, if scores range from 0 to 10,000 for nodes, then the numerator may be a value such as: 100; 500; 1,000; 2,000; 2,500; 5,000; 10,000; 20,000; etc. In some implementations, the multiplier can be the minimum value of a fixed number multiplier and a determined value multiplier for each node. For example, using a fixed number multiplier of 0.25, then multiplier(node)=numerator/score(node)−1 is used when the computed multiplier less than 0.25, otherwise the fixed number multiplier is used (e.g., when the computed multiplier is greater than or equal to 0.25).

A content detection module 230 examines propagated scores (that may have been dampened and/or boosted) for nodes of the graph to determine a likelihood that a profile page associated with each of the nodes contains content associated with the particular subject (e.g., step 122 described above with regard to FIG. 1A). The content detection module 230 can identify pages of the social network that are likely to contain content associated with the particular subject of interest based upon a variety of factors, such as a comparison between a score for the page and a threshold score, a comparison between a score for the page and scores for other nodes, etc.

The content detection module 230 can provide information regarding the identified profile pages to the social network server 204, to the client 210, or any other device may have requested that the content detection server system 202 detect content on the social network. The social network server system 204 can receive and process the identification information with a identified profile processing module 232. Depending on the particular subject of interested requested (e.g., content related to advertising, adult content, content in violation of a EULA, etc.), the identified profile processing module 232 can perform various operations, such as targeting a user for advertising on the social network, restriction and/or deletion of a user's account on the social network, etc.

In some implementations, the social network server system 204 and the content detection server system 202 are part of the same system. In such implementations, the social network graph can be updated by the social network graph linking module 220 with current information (e.g., "real time" data) regarding users and directional links as they change on the social network. Using the social network graph updated with current information, the system can detect content on the social network in real time by updating the scores for nodes on the social graph as it changes. The system can continuously detect content on the social network with a real time social network graph and updated node scores using the score seeding component 222, the iterative score propagation module 224, the score dampening component 226, the score boosting component 228, and the profile content detection module 230.

In one example of such implementations, the social graph of browsing patterns can be held in memory by the system. When an event (e.g., page view, content view, etc.) occurs that is related to browsing patterns (e.g., node to be added, directional links to be added, etc.), the event can be added to a queue of browsing events. During idle time, the server system can grab events from the queue to update the social graph of browsing patterns (e.g., add nodes, add directional links, etc.). For each update to the graph, scores (viewer and owner scores) can be propagated local to the area of the social graph where the update was performed. Such an example implementation can permit faster detection of content on the social network by integrating real time data into the social graph.

Figure 3A:
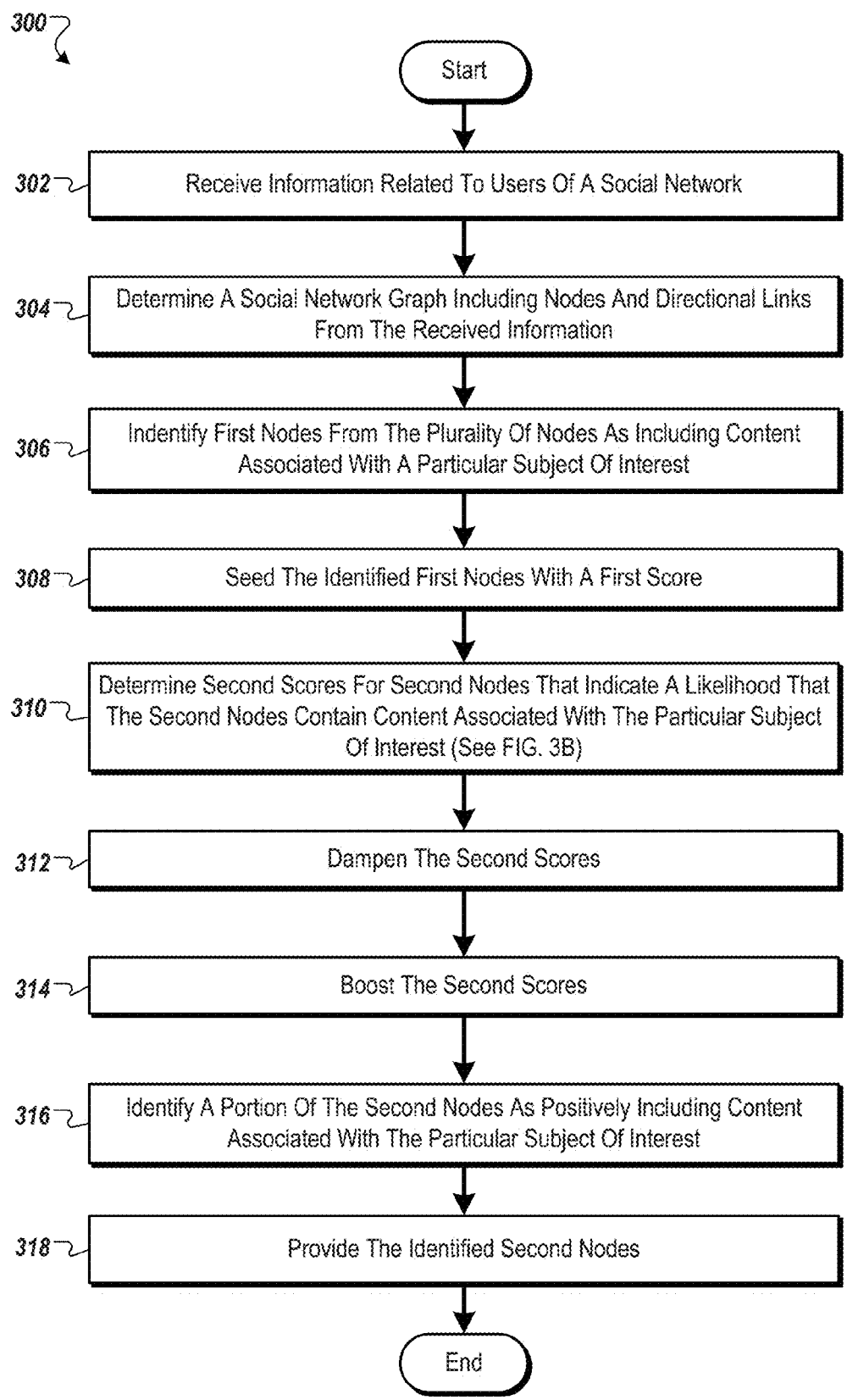
FIGS. 3A-B are flowcharts showing example techniques to detect content on a social network that is related to a particular subject of interest based upon user browsing patterns.
Figure 3B:
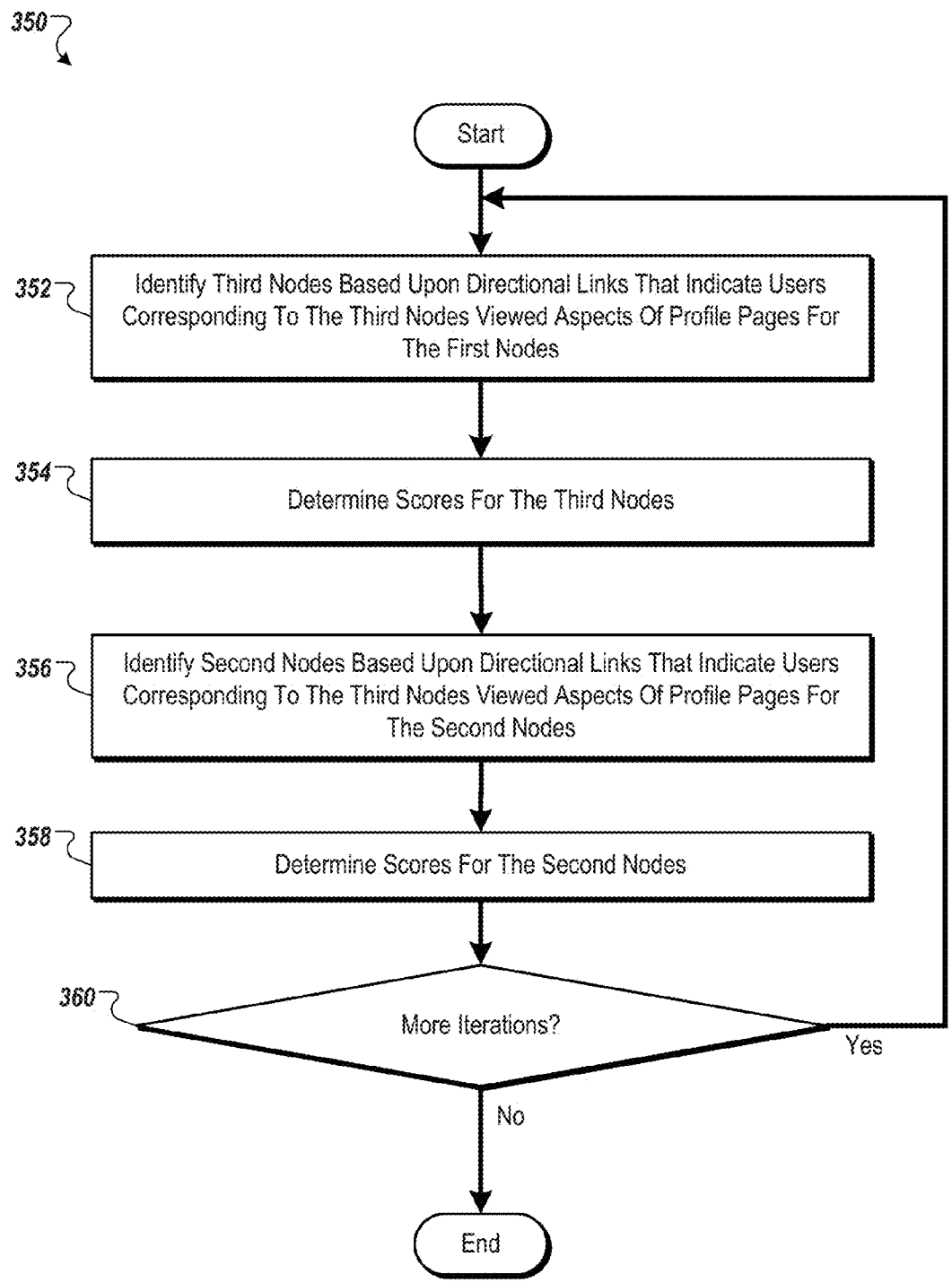

FIGS. 3A-B are flowcharts showing example techniques 300 and 350 to detect content on a social network that is related to a particular subject of interest based upon user browsing patterns. The techniques 300 and 350 are presented from the perspective of a content detection server system, such as the content detection systems 102 and 202. The techniques 300 and 350 can be performed on a variety of systems, such as the content detection systems 102 and 202, as described above with regard to FIGS. 1A and 2.

Referring to FIG. 3A, the technique 300 regards identifying pages of a social network that are likely to contain content associated with a particular subject of interest. The technique 300 begins at step 302 by receiving information related to users of a social network. The received information can include a variety of information, such as user browsing patterns, profile pages positively identified as having content associated with a particular subject of interest, etc. As described above, user browsing patterns can be based upon a variety of user actions with regard to a social network, such as views of pages on the social network (e.g., profile page views, forum page views, group page views, etc.), views of specific content located on the social network (e.g., photos, videos, etc.), interaction with other users of the social network (e.g., posting comments to forums, playing online games with other users, etc.), etc.

A social network graph that includes nodes and directional links can be determined from the received information (304). The social network graph can be determined from the received information. For example, if a social network has users U1 and U2, the graph can include nodes that correspond to users U1 and U2. If user U1 views U2's profile page (or other content on the social network associated with user U2 (e.g., photo, video, forum post, etc.)), then a directional link connecting users U1 and U2 can be created. Such a directional link can indicate that user U1 viewed U2's profile page, similar to the directional links depicted in the social graph 106, described above with reference to FIG. 1A.

The directional links may be weighted according to a variety of factors, such as number of views (e.g., user U1 viewed U2's page five times), frequency of views (e.g., user U1 viewed U2's profile page an average of two times per week), an amount of content viewed that is related to the particular subject of interest (e.g., 30% of the content that user U1 viewed from U2's profile page related to the particular subject of interest), etc. Weights can be assigned to directional links when creating the social graph, for example, by the social network graph linking module 220 described above with regard to FIG. 2.

Weighted directional links can be used to further indicate which pages of the social graph are likely to contain content associated with the particular subject of interest. For example, if the profile page for user U3 is identified as being associated with adult content (an example particular subject of interest), a directional link between users U1 and U3 that has a greater weight than a directional link between users U2 and U3 can provide an indication that user U1 (and the other pages viewed by user U1) is more likely associated with adult content than user U2.

First nodes can be identified from the plurality of nodes contained in the social network graph as including content associated with a particular subject of interest (306). The first nodes can be identified in a variety of ways, as described above with reference to FIG. 1A and the described repository of identified profiles 110. The identified first nodes can be seeded with a first score (308). The first score can be a score that is indicative of positive identification. For instance, if scores for nodes range from 0.0 to 1.0 and a score of 0.0 represents a 0% likelihood an associated profile page contains content pertaining to the particular subject of interest and a score of 1.0 may represent a 100% likelihood, then the first nodes can be seeded with a score of 1.0. A variety of score ranges can be used, such as 0-100, -100-100, 0-10,000, etc.

Referring to FIG. 1A as an illustrative example, the social network graph 116 can be determined (step 304) based upon received social network browsing patterns 108 (step 302) for the users U1-U7. The node for user U2 can be identified based upon information received from the identified profile repository 110 (step 306) seeded with a score (step 308) indicative of positively identified content.

In some implementations, nodes that are associated with pages that are likely to contain content associated with the particular subject of interest but which have not yet been positively identified can be included in the group of first nodes. For example, nodes that are associated with profile pages that have been computed to have a high likelihood (e.g., greater than 75% chance of containing content associated with the particular subject of interest, etc.) can be included in the group of first nodes. The likelihood a profile page contains content associated with the particular subject of interest can be determined from the described techniques. Such nodes can be seeded with the first score (the same score as positively identified nodes) or a score that is less than the first score (e.g., a score that corresponds to a likelihood that the node contains content associated with the particular subject of interest).

Second scores for second nodes in the determined graph can be determined based upon the scores of the first nodes and directional links connecting the second nodes to the first nodes (step 310). The second scores for the second nodes can indicate a likelihood that the second nodes contain content associated with the particular subject of interest. Referring to FIG. 1A again, a likelihood that profile pages associated with the nodes U1 and U3-U7 (the second nodes) can be determined based upon the links of the graph 106 that connect to the node U2 (the first node).

A variety of techniques can be used to propagate scores from a first node to the second nodes. In one example technique, scores are propagated through directional links from an "owner" of content (e.g., profile page containing content that is being viewed) to a "viewer" of content. Referring to the social graph 106 from FIG. 1A as an illustrative example, the directional link from user U1 to user U2 indicates that user U1 is a viewer of content (e.g., profile page, photo, video, etc.) "owned" by user U2 (e.g., owner of content). For instance, if the user U2 has been identified as positively containing content associated with a particular subject of interest and is seeded with a score (e.g., U2 identified as a first node and seeded with a first score), then the score can be propagated from U2 to user U1.

The extent to which scores are be propagated from an owner to a viewer can vary depending on, among other things, characteristics of users on specific the social network being examined. For instance, in social networks where viewers and owners of content tend to be distinct groups of users within the social network (e.g., viewers tend to view content associated with the particular subject of interest without posting similar content to their profile pages), separate viewer and owner scores can be employed. For example, a node can have both a viewer score and an owner score. The viewer score for a node being scored can be based upon the owner scores of nodes connected to the node being scored by directional links. The owner score for a node being scored can be based upon the viewer scores of nodes connected to the node being scored by directional links.

Referring to the social graph 116 described with regard to FIG. 1A, the node for user U2 can be seeded with an owner score. Based upon the directional links that indicate users U1 and U4 are viewers of the node U2, the owner score from U2 can be propagated to U1 and U4 as a viewer score. As indicated by the other directional links associated with U1 and U4, the nodes U3 and U6 are additional owners of content viewed by U1 and U4. The viewer scores for U1 and U4 can be propagated to nodes U3 and U6 as an owner score.

Any number of iterations of propagating scores from owners to viewers to owners can be used (e.g., 1 iteration, 2 iterations, 3 iterations, 5 iterations, 8 iterations, etc.). The number of iterations can depend upon a variety of factors, such as the type of social network (e.g., friendship network, business network, etc.), the number of users on the social network, the size of the social graph being examined, empirical data regarding an optimal number of iterations to arrive at an accurate rate of detection, etc.

A score propagated to a viewer node can be based upon a combination of the scores for each owner node that, as indicated by the directional links of the social graph, was viewed by the viewer node. Scores for the owner nodes can be combined in a variety of ways to generate the score for the viewer node. For instance, the score for the viewer node can be based upon the mean, the root mean square (quadratic mean), threshold root mean square, etc. of scores for the owner nodes connected to the viewer node through directional links.

The combined scores of the owner nodes can be weighted according to a variety of factors, such as the weight of each directional link connecting the viewer node to the owner node, the number (or ratio) of owner nodes that can be classified as strongly associated with the particular subject of interest, etc. An owner node that is strongly associated with the particular subject of interest can be an owner node that has a score of at least a threshold level (e.g., for scores ranging from 0.0 to 1.0, an owner node that has a score of 0.8 or greater can be classified as strongly associated). In some implementations, only owner nodes that have been positively identified as being associated with the particular subject of interest are classified as being strongly associated with the particular subject of interest.

For instance, a score for a viewer node can be a weighted mean of the scores of the owner nodes to which the viewer node is connected by directional links. The mean score of the owner nodes can be weighted by a value that is based upon the number (or ratio) of owner nodes that are strongly associated with the particular subject of interest. For example, the weight can be determined by the logarithm of the number of owners that are strongly associated with the particular subject of interest. By basing the weight upon a logarithmic function of the number of strongly associated owners, heavy weighting of a score for a viewing node is reserved for viewing nodes that have an established pattern of viewing content associated with owner nodes that are strongly associated with the particular subject. Such a logarithmic function can protect a naïve viewer node (e.g., a viewer that accidentally/unintentionally ended-up viewing content from a few owner nodes that are strongly associated with the particular subject of interest) from receiving a heavily weighted score.

For instance, assume that the particular subject of interest is content that is in violation of a EULA on a social network (e.g., copyrighted material, illicit content, etc.). The social network would like to locate profile pages of users that are likely hosting such content. Using users that were previously identified as having profile pages containing such content, the graph of the social network is seeded with positively identified nodes. Assume further that user U1 has viewed 5 profile pages on the social network and user U2 has viewed 500 profile pages. Two of the profile pages viewed by user U1 were profile pages of positively identified users (e.g., owner nodes strongly associated with the particular subject of interest) and 200 of the profile pages viewed by user U2 were profile pages of positively identified users. Although the ratio of positively identified profile page views is the same for users U1 and U2 (40% of profile pages viewed), the user U1 has not demonstrated the same pattern of viewing content associated with positively identified profile pages as user U2 (e.g., user U1's positively identified profile page views may have been accidental and/or unrelated to content in contravention of the social network EULA). Using the logarithmic weighting function described above, the score for user U1 can be weighted less than the score for the user U2 to reflect user U1's lack of an established viewing pattern associated with content in contravention of the social network EULA.

Below is an example of a formula for determining the score of a viewer node using the mean of owner node scores weighted by a logarithmic function of the number of strongly associated owners.

$$\text{score(viewer)} = \frac{\text{sum(owner\_scores)} * \log(\text{count(strongly\_associated\_owners)} + 1)}{\text{count(owners)}}$$

The "score(viewer)" is the score for a viewer node. The "sum (owner_scores)" is the sum of owner scores for nodes that have content that was viewed by the viewer node. The "count (strongly_associated_owners)" is the number of owner nodes that have content that was viewed by the viewer node content and that are strongly associated with the particular content of interest. In some instances, an owner node is strongly associated if an owner score has been propagated to the node. The "count(owners)" is the number of owner nodes that have content that was viewed by the viewer node. An illustrative example of this formula is presented below with regard to FIG. 6.

Scores can be propagated from viewing nodes to owner nodes in a similar fashion to the description above with regard to propagation of scores from owner nodes to viewer nodes. For instance, if a profile page (or specific content posted on the profile page) for a user U1 is viewed by user U2-U5, then the viewing scores for users U2-U5 can be used to generate a content owner score for user U1. Techniques similar to those described above can be used to propagate scores from viewing nodes to owner nodes. For example, a score for an owner of content be calculated from the mean, the weighted mean, the root mean square (quadratic mean), threshold root mean square, etc. of scores for viewing scores for nodes that viewed content from the owner. The mean can be weighted based upon a number of viewer nodes that are strongly associated with the particular subject of interest (e.g., nodes having a viewing score that is greater than or equal to a threshold score). For example, a logarithmic function can be used for weighting the mean of viewer scores associated with an owner of content.

Below is an example of a formula for determining the score of an owner node using the mean of viewer node scores weighted by a logarithmic function of the number of strongly associated viewers.

$$\text{score(owner)} = \frac{\text{sum(viewer\_scores)} * \log(\text{count(strongly\_associated\_viewers)} + 1)}{\text{count(viewers)}}$$

The "score(owner)" is the score for an owner node. The "sum(viewer_scores)" is the sum of viewer scores for nodes that viewed content from the owner node. The "count(strongly_associated_viewers)" is the number of viewer nodes that viewed content from the owner node that are strongly associated with the particular content of interest. In some instances, a viewer node is strongly associated if a viewer score has been propagated to the node. The "count(viewers)" is the number of viewer nodes that viewed content from the owner node. An illustrative example of this formula is presented below with regard to FIG. 6.

See the disclosure below with regard to FIG. 3B for a description of the iterative propagation of scores from owner nodes to viewer nodes and from viewer nodes to owner nodes.

With the second scores (e.g., owner score) determined at step 310, the second scores can be dampened (312). Dampening can be performed in a manner similar to the dampening performed by the score dampening component 226, as described above with regard to FIG. 2. A second score for a node can be dampened based upon the number of iterations it took for an owner score to reach the node (e.g., the depth of the node). For example, if an owner score was propagated to user U1 in a first iteration and to user U2 in a third iteration, the score for the user U2 can be dampened (e.g., decreased) by a greater amount than the score for the user U1.

The second scores can also be boosted (314). Boosting can be performed in a manner similar to the boosting performed by the score boosting component 228, as described above with regard to FIG. 2. Score boosting can be used in a variety of instances, such as when content on a user's profile page is viewed by both a large number of viewers that are strongly associated with the particular content and a large number of viewers that are not strongly associated with the particular content. For example, a user profile page that contains a celebrity name may attract a large number of naïve viewers that are otherwise uninterested in the content posted on the user's profile page. In such instance, the scores of naïve viewers should not dilute the scores of strongly associated viewers for the owner of the content. Scores can be boosted based upon a magnitude of strongly associated viewers of content owned by a particular user.

A portion of the second nodes can be identified as positively including content associated with the particular subject of interest (316). The second nodes can be identified based upon their owner scores, as determined in the previously described steps. For instance, a second node can be positively identified if the second node has an owner score that exceeds a threshold score. The threshold score can be determined in a variety of ways, such as through analysis of empirical data associated with various threshold scores.

The identified second nodes can be provided to a variety of entities (318). For example, the positively identified second nodes can be provided to a social network server system (e.g., the social network server system 204), to a repository of identified profiles (e.g., the repository of identified profiles 218), etc. In some implementations, scores for the second nodes are provided in addition/instead of information regarding positive identification. After the step 318, the technique 300 can end.

Referring to FIG. 3B, the technique 350 regards iteratively propagating scores from owners of content to viewers of content and from viewers to owners of content. The technique 350 iteratively propagates scores through a social graph that is constructed based upon user browsing patterns. The technique can be performed as part of other techniques for identifying content on a social network, such as at the step 310 of the technique 300.

The technique 350 begins at step 352 by identifying third nodes based upon directional links that indicate that users corresponding to the third nodes viewed aspects (e.g., photos, videos, text, etc.) of profile pages for the first nodes. The third nodes can be viewers of content and the first nodes can be owners of content. For example, referring to the social graph 116 described with regard to FIG. 1A, if the first node is the seeded node for user U2, the third nodes can be the nodes for users U1 and U4.

Scores for the identified third nodes can be determined (354). Scores for the third nodes can be determined similar to the technique for determining scores for nodes that are viewers of content, as described above with regard to FIG. 3A.

Second nodes can be identified based upon directional links that indicate that users corresponding to the third nodes viewed aspects of profile pages for the second nodes (356). The second nodes can be owners of content that the third nodes viewed. For example, referring to the social graph 116 described with regard to FIG. 1A, if the third nodes are the nodes for users U1 and U4, then the second nodes can be the nodes for users U3 and U6. In some implementations, the second nodes can additionally include the node for user U2 (e.g., the positively identified node initially seeded with a score).

Scores can be determined for the second nodes (358). Scores for the second nodes can be determined similar to the technique for determining scores for nodes that are owners of content, as described above with regard to FIG. 3A.

A determination can be made as to whether more iterations of the steps 352-358 should be performed (360). The number of iterations performed can be based upon a variety of factors, such as the size of the social graph, the number of users on the social network, the type of social network, empirical data regarding a sufficient number of iterations, etc. If there are more iterations to be performed, then the steps 352-358 are repeated and scores are propagated further across the social graph. If there are no more iterations to perform, then the technique 350 ends.

Figure 4:
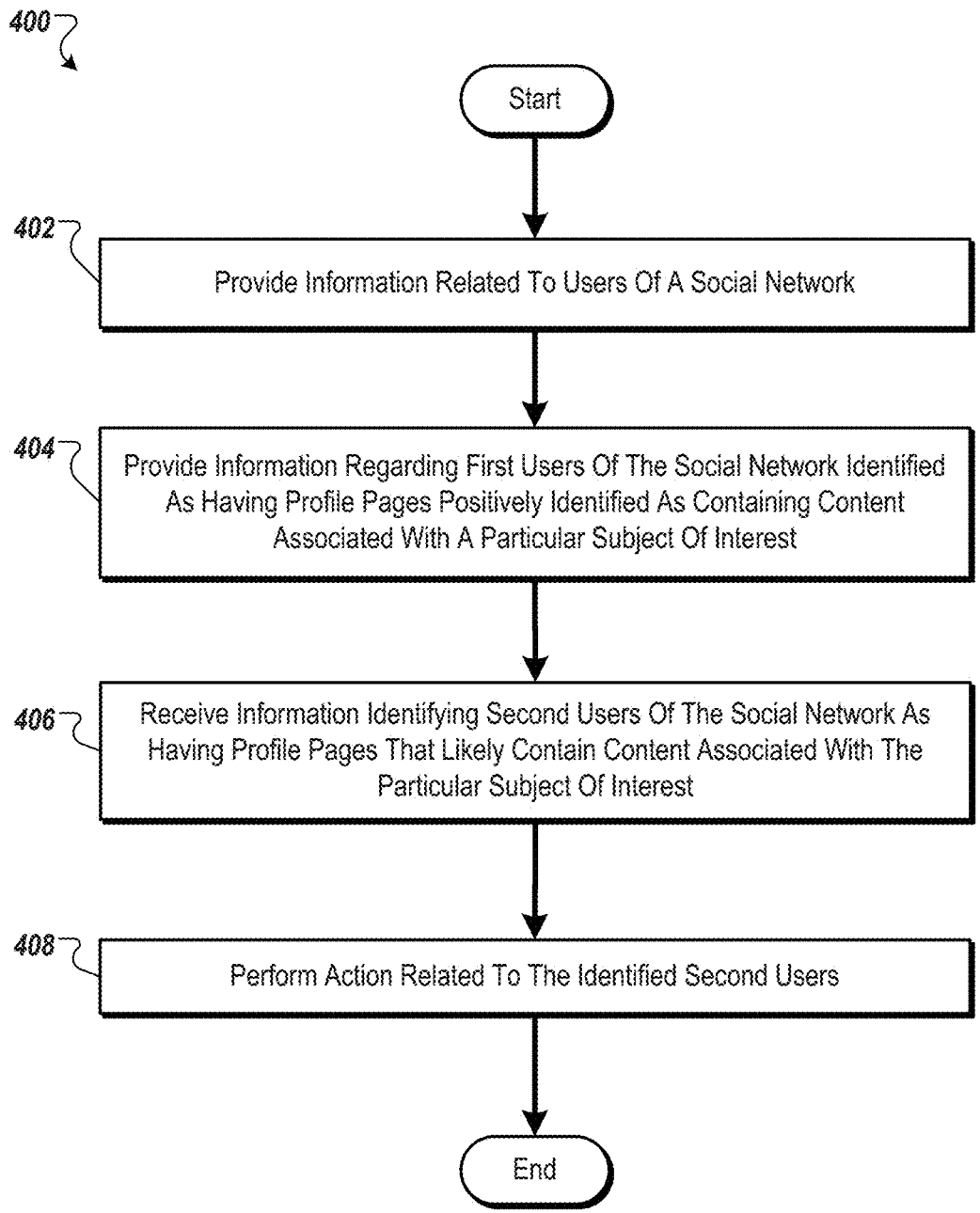
FIG. 4 is a flowchart showing an example technique to detect content on a social network that is related to a particular subject of interest based upon user browsing patterns.

FIG. 4 is a flowchart showing an example technique 400 to detect content on a social network that is related to a particular subject of interest based upon user browsing patterns. The technique 400 is presented from the perspective of a social network server system, such as the social network servers 104 and the social network server system 204. The technique 400 can be performed on a variety of systems, such as the social network servers 104 and the social network server system 204, as described above with regard to FIGS. 1A and 2.

The technique 400 can begin at step 402 by providing information related to users of a social network. The provided information can regard browsing patterns for users of the social network. The information can pertain to some or all of the users of the social network. For instance, information regarding a sub-graph (e.g., a group of users on the social network with many connections to each other and few to users outside of the group) of the social network can be provided. The information can be provided to a content detection server system, such as the content detection server system 202, as described above with regard to FIG. 2. In conjunction with the information relating to users of the social network, a request to identify content pertaining to a particular subject of interest can be provided.

Information regarding first users of the social network that have been identified as having profile pages containing content associated with the particular subject of interest can be provided (404). For instance, the social network server system 204 can provide information regarding identified profile pages using the repository of identified profiles, as described above with regard to FIG. 2.

Information identifying second users of the social network as having profile pages that are likely to contain content associated with the particular subject of interest can be received (406). For instance, the social network server system 204 can receive information identifying the second users as likely having profile pages that contain content associated with the particular subject of interest from the content detection server system 202, as described above with regard to FIG. 2.

An action related to the identified second users can be performed (408). The action can vary depending on the particular subject of interest. For instance, if the particular subject of interest is related to advertising content, then the action may involve displaying an advertisement associated with the particular subject on a profile page of one of the second users. In another example, if the particular subject of interest is adult content that violates a EULA for the social network, the action can involve removing the content from the second users' profile pages, deleting/disabling the second users' profile pages, etc. In some instance, the action can involve submitting the profile pages for the second users to a queue of profile pages for manual content review. After the step 408, the technique 400 ends.

Figure 5:
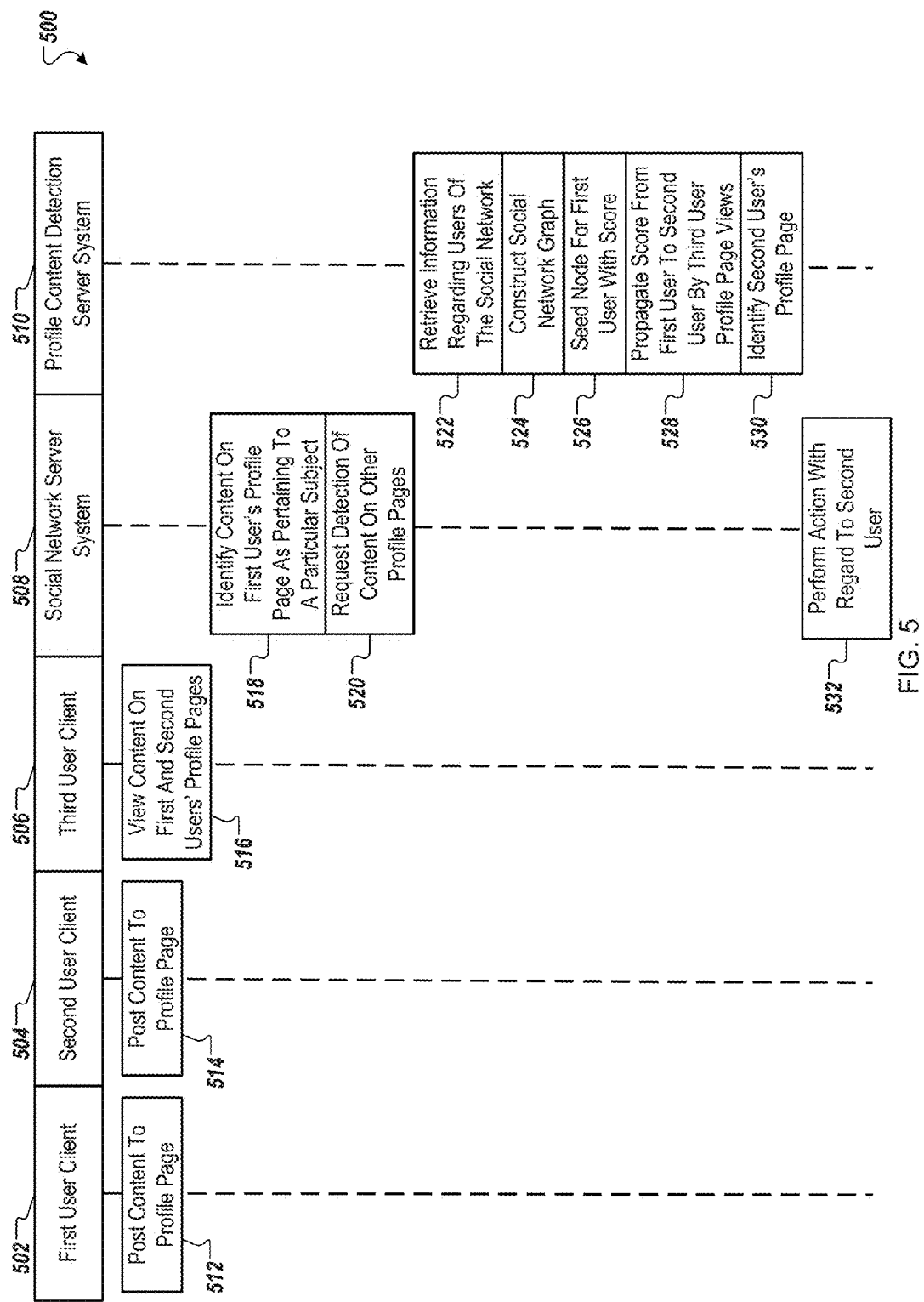
FIG. 5 is a timeline of an example process for detecting content pertaining to a particular subject of interest on a social network.

FIG. 5 is a timeline 500 of an example process for detecting content pertaining to a particular subject of interest on a social network. The example process can be performed by a first user client 502, a second user client 504, a third user client 506, a social network server system 508 and a content detection server system 510, which may be similar to and/or correspond to the client computer 210, the social network server system 204, and the content detection server system 202, as described above with regard to FIG. 2. Similarly, the example process depicted on the timeline 400 may be similar to the techniques 300, 350, and/or 400, described above with respect to FIGS. 3A-B and FIG. 4.

At time 512, the first user client 502 (a client for a first user of a social network) posts content (e.g., image, video, text, game, etc.) to a profile page for the first user. The second user client 504 (a client for a second user of the social network) posts content to a profile page for the second user (time 514). The third user client 506 (a client for a third user of the social network) views the content posted on profile pages for both the first user and the second user (time 516).

At time 518, the social network server system 508 identifies that content posted to the first user's profile page pertains to the particular subject of interest. For instance, the social network server system 508 can identify the first user's profile page in a variety of ways, as described above with regard to the repository of identified profiles 218. The social network server system 508 can request detection of content pertaining to the particular subject of interest (time 520). The request can be provided from the social network server system 508 to the content detection server system 510.

At time 522, information regarding users of the social network can be retrieved by the content detection server system 510. The retrieved information can include browsing patterns of users of the social network. The profile content detection server system 510 can construct a social network graph from the retrieved information (time 524). At time 526, the profile content detection server system 510 can seed a node corresponding to the first user with a score that indicates the profile page for the first user was identified as containing content associated with the particular subject of interest. At time 528, the content detection server system 510 can propagated the seeded score from the first user to the second user based upon the third user having viewed content on both the first and second users' profile pages at time 516. The content detection server system 510 can identify that the profile page for the second user likely contains content associated with the particular subject of interest based upon the propagated score (time 530).

The content detection server system 510 can provide information regarding identification of the second user to the social network server system 508. At time 532, the social network server system 508 can perform an action with regard to the second user. As described above, the action can vary depending on a variety of factors, such as the particular subject of interest.

Figure 6:
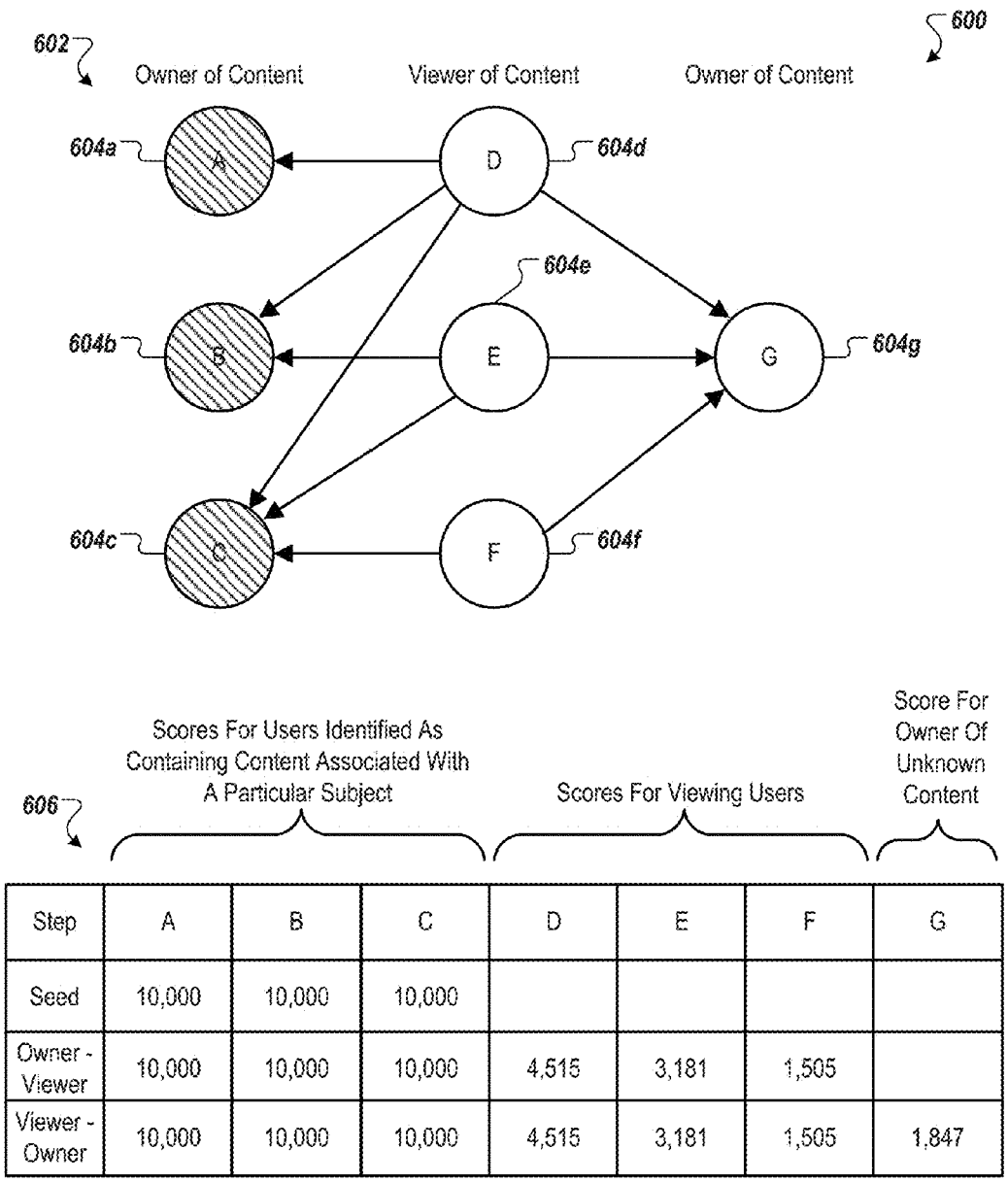
FIG. 6 is a simple example illustration of propagating scores across a social graph for the purpose of identifying profile pages that are likely to contain content associated with a particular subject of interest.

FIG. 6 is a simple example illustration 600 of propagating scores across a social graph for the purpose of identifying profile pages that are likely to contain content associated with a particular subject of interest. The illustration 600 is an example of score propagation using the techniques 300 and 350, as described above with reference to FIGS. 3A-B. The score propagation depicted in the illustration 600 can be performed using a variety of systems, such as systems 100 and 200 described above with regard to FIGS. 1A and 2.

The illustration 600 includes a social graph 602 that is made-up of nodes 604a-g corresponding to users A-G of a social network. The nodes 604a-g are connected by directional links that indicate a user viewed content associated with another user (the social graph is constructed from user browsing patterns). For example, the node for user D 604d is connected to the node for user A 604a by a directional link that indicates the user D viewed content (e.g., image, video, text, etc.) posted on the user A's profile page.

For the purposes of simplification, the nodes 604a-c and 604g are depicted as being owners of content and the nodes 604d-f are depicted as being viewers of content. As described above, it is possible for a node to be both an owner and a viewer of content. The users D-F (represented by the nodes 604d-f) viewed content posted on profile pages for the users A-C and G (represented by the nodes 604a-c and 604g). As indicated by the shading for the nodes 604a-c, the corresponding users A-C have been identified as having profile pages that contain content associated with a particular subject of interest (e.g., music, sports, news, adult content, content in violation of a EULA, etc.).

A chart 606 depicts the scores for each node as they are propagated through the social graph 602. At a first seeding step, the nodes 604a-c for users A-C are seeded with an initial score of 10,000. The seeded scores for nodes 604a-c are propagated at step "Owner—Viewer" to the viewer nodes 604d-f using the example formula described above with regard to step 310. For example, the node 604d for user D is depicted in the graph 602 as viewing content for four nodes (604a-c and 604g), three of which are strongly associated with the particular subject of interest. Using the formula, the viewing score for the node 604d is calculated as 4,515 (4,515=(10,000+10,000+10,000)*log(3+1)/4).

The scores for nodes 604d-f are propagated at step "Viewer—Owner" to the owner node 604g using the example formula described above with regard to step 310. The node 604g for user G is depicted in the graph 602 as having content (e.g., image, video, profile page, forum post, etc.) that was viewed by each of the three users D-F (nodes 604d-f). In this example, each of the three nodes 604d-f is considered to be strongly associated with the particular subject of interest based upon each node having an associated score that is greater than zero, as depicted in the chart 606. Using the formula presented above and the values presented in the chart 606, the owner score for the node 604g is calculated as 1,847 (1,847=(4,515+3,181+1,505a)*log(3+1)/3).

Figure 7:
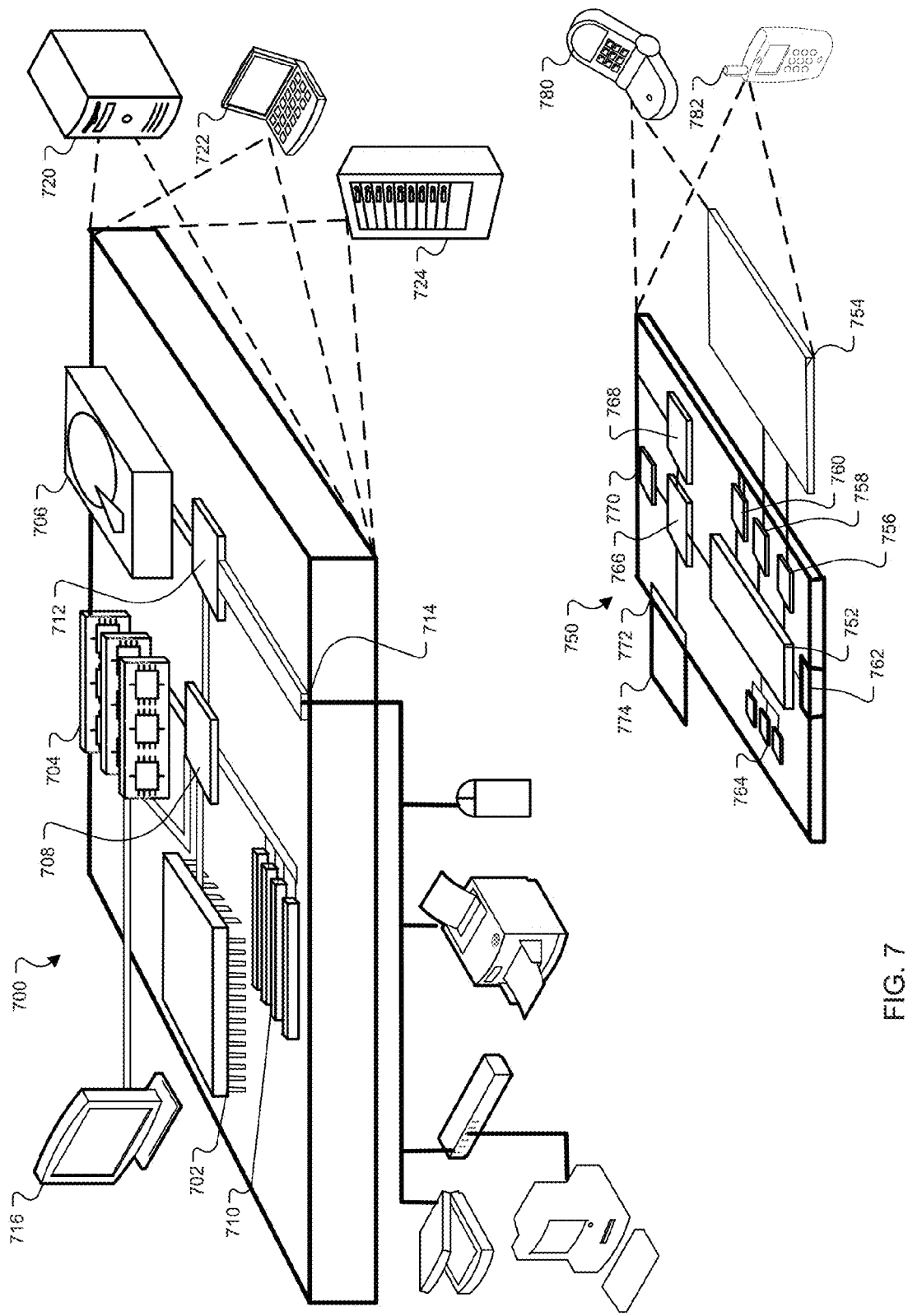
FIG. 7 is a block diagram of computing devices that may be used to implement the systems and methods described in this document, as either a client or as a server or plurality of servers.

FIG. 7 is a block diagram of computing devices 700, 750 that may be used to implement the systems and methods described in this document, as either a client or as a server or a plurality of servers. Computing device 700 is intended to represent various forms of digital computers, such as laptops, desktops, workstations, personal digital assistants, servers, blade servers, mainframes, and other appropriate computers. Computing device 750 is intended to represent various forms of mobile devices, such as personal digital assistants, cellular telephones, smartphones, and other similar computing devices. Additionally computing device 700 or 750 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations of the inventions described and/or claimed in this document.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. The memory 704 may also be another form of computer-readable medium, such as a magnetic or optical disk.

The storage device 706 is capable of providing mass storage for the computing device 700. In one implementation, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 704, the storage device 706, or memory on processor 702.

The high speed controller 708 manages bandwidth-intensive operations for the computing device 700, while the low speed controller 712 manages lower bandwidth-intensive operations. Such allocation of functions is exemplary only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 can execute instructions within the computing device 750, including instructions stored in the memory 764. The processor may be implemented as a chipset of chips that include separate and multiple analog and digital processors. Additionally, the processor may be implemented using any of a number of architectures. For example, the processor 410 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT (Thin-Film-Transistor Liquid Crystal Display) display or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be provide in communication with processor 752, so as to enable near area communication of device 750 with other devices. External interface 762 may provide, for example, for wired communication in some implementations, or for wireless communication in other implementations, and multiple interfaces may also be used.

The memory 764 stores information within the computing device 750. The memory 764 can be implemented as one or more of a computer-readable medium or media, a volatile memory unit or units, or a non-volatile memory unit or units. Expansion memory 774 may also be provided and connected to device 750 through expansion interface 772, which may include, for example, a SIMM (Single In Line Memory Module) card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provide as a security module for device 750, and may be programmed with instructions that permit secure use of device 750. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, or memory on processor 752 that may be received, for example, over transceiver 768 or external interface 762.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, WiFi, or other such transceiver (not shown). In addition, GPS (Global Positioning System) receiver module 770 may provide additional navigation- and location-related wireless data to device 750, which may be used as appropriate by applications running on device 750.

Device 750 may also communicate audibly using audio codec 760, which may receive spoken information from a user and convert it to usable digital information. Audio codec 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, it may be implemented as a cellular telephone 780. It may also be implemented as part of a smartphone 782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. Moreover, other mechanisms for detecting content on a social network may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A computer-implemented method comprising:
   obtaining, by a computer system, information that identifies viewing activity of users with regard to content that is associated with social network profiles, wherein the viewing activity identifies content that the users have viewed;
   identifying, by the computer system, a portion of the social network profiles, associated with a first group of users, that include a particular category of content;
   assigning, to the portion of the social network profiles, initial scores that indicate that the portion of the social network profiles include the particular type of content;

determining, by the computer system, viewer scores for the first group of users based on i) the viewing activity of the first group of users and ii) the initial scores that are assigned to the portion of the social network profiles;

determining, by the computer system, content scores for each user in a second group of users in a remaining portion of the social network profiles based on, for each user in the second group, i) the viewing activity of a particular user in the second group of users, ii) the viewer scores for the first group of users, and iii) a weighting value that indicates a closeness of a relationship between the particular user in the second group of users and a particular user in the first group of users; and selecting, by the computer system and based on the content scores, one or more users in the second group of users in the remaining portion of the social network profiles as having at least a threshold likelihood of including the particular category of content.

2. The computer-implemented method of claim 1, wherein a particular viewer score for a particular user is determined based on a combination of scores for particular social network profiles that the particular user has viewed, as indicated by the viewing activity.

3. The computer-implemented method of claim 2, wherein the combination of scores for the particular social network profiles comprises a mean of the scores for the particular social network profiles.

4. The computer-implemented method of claim 2, wherein the combination of scores for the particular social network profiles comprises a root mean square of the scores for the particular social network profiles.

5. The computer-implemented method of claim 2, wherein a particular content score for a particular social network profile is determined based on a combination of particular viewer scores for particular users who have viewed the particular social network profile, as indicated by the viewing activity.

6. The computer-implemented method of claim 5, wherein the combination of particular viewer scores for the particular users comprises a mean of the particular viewer scores for the particular users.

7. The computer-implemented method of claim 5, further comprising:

determining the weighting value for the particular users based on a number of the particular users with viewing scores that are greater than or equal to a threshold score; and wherein the combination of particular viewer scores for the particular users comprises a mean of the particular viewer scores for the particular users that is weighted by the weighting value for the particular users.

8. The computer-implemented method of claim 7, wherein the weighting value comprises a log of the number of particular users plus one.

9. The computer-implemented method of claim 5, wherein the combination of the particular viewer scores for the particular users comprises a root mean square of the particular viewer scores for the particular users.

10. The computer-implemented method of claim 1, wherein the particular category of content comprises at least one of the group consisting of adult content and illegal content.

11. The computer-implemented method of claim 1, further comprising:

iteratively determining the viewer scores and determining the content scores for at least a threshold number of iterations; and wherein the one or more of the remaining portion of the social network profiles is selected based on the content scores after at least the threshold number of iterations.

12. A computer system comprising:

one or more computing devices;

an interface of the one or more computing devices to obtain information that identifies viewing activity of users with regard to content that is associated with social network profiles, wherein the viewing activity identifies content that the users have viewed;

a score seeding component that is programmed to identify a portion of the social network profiles, associated with a first group of users, that include a particular category of content, and to assign, to the portion of the social network profiles, initial scores that indicate that the portion of the social network profiles include the particular type of content;

a score propagation module that is programmed to determine viewer scores for the first group of users based on i) the viewing activity of the users and ii) the initial scores that are assigned to the portion of the social network profiles, and to determine content scores for each user in a second group of users in a remaining portion of the social network profiles based on, for each user in the second group, i) the viewing activity of a particular user in the second group of users, ii) the viewer scores for the first group of users, and iii) a weighting value that indicates a closeness of a relationship between the particular user in the second group of users and a particular user in the first group of users; and a profile detection module that is programmed to select, based on the content scores, one or more users in the second group of users in the remaining portion of the social network profiles as having at least a threshold likelihood of including the particular category of content.

13. The system of claim 12, wherein a particular viewer score for a particular user is determined based on a combination of scores for particular social network profiles that the particular user has viewed, as indicated by the viewing activity.

14. The system of claim 13, wherein the combination of scores for the particular social network profiles comprises a mean of the scores for the particular social network profiles.

15. The system of claim 13, wherein the combination of scores for the particular social network profiles comprises a root mean square of the scores for the particular social network profiles.

16. The system of claim 12, wherein a particular content score for a particular social network profile is determined based on a combination of particular viewer scores for particular users who have viewed the particular social network profile, as indicated by the viewing activity.

17. The system of claim 16, wherein the combination of particular viewer scores for the particular users comprises a mean of the particular viewer scores for the particular users.

18. The system of claim 16, wherein the score propagation module is further programmed to determine the weighting value for the particular users based on a number of the particular users with viewing scores that are greater than or equal to a threshold score; and wherein the combination of particular viewer scores for the particular users comprises a mean of the particular viewer scores for the particular users that is weighted by the weighting value for the particular users.

19. The system of claim 18, wherein the weighting value comprises a log of the number of particular users plus one.

20. A computer program product embodied in a computer readable storage device storing instructions that, when executed, cause one or more computing devices to perform operations comprising:
- obtaining information that identifies viewing activity of users with regard to content that is associated with social network profiles, wherein the viewing activity identifies content that the users have viewed;
- identifying a portion of the social network profiles, associated with a first group of users, that include a particular category of content;
- assigning, to the portion of the social network profiles, initial scores that indicate that the portion of the social network profiles include the particular type of content;
- determining viewer scores for the first group of users based on i) the viewing activity of the first group of users and ii) the initial scores that are assigned to the portion of the social network profiles;
- determining content scores for each user in a second group of users in a remaining portion of the social network profiles based on, for each user in the second group, i) the viewing activity of a particular user in the second group of users, ii) the viewer scores for the first group of users, and iii) a weighting value that indicates a closeness of a relationship between the particular user in the second group of users and a particular user in the first group of users; and
- selecting, based on the content scores, one or more users in the second group of users in the remaining portion of the social network profiles as having at least a threshold likelihood of including the particular category of content.

* * * * *